United States Patent
Sakaguchi et al.

(10) Patent No.: US 10,626,240 B2
(45) Date of Patent: *Apr. 21, 2020

(54) POLYMER AEROGEL WITH IMPROVED MECHANICAL AND THERMAL PROPERTIES

(71) Applicant: BLUESHIFT MATERIALS, INC., San Marcos, TX (US)

(72) Inventors: Alan D. Sakaguchi, San Antonio, TX (US); Garrett D. Poe, San Marcos, TX (US); David J. Irvin, San Marcos, TX (US); Alysa M. Joaquin, San Marcos, TX (US); Janae D. Manning, San Marco, TX (US)

(73) Assignee: Blueshift Materials, Inc., Spencer, MA (US)

( * ) Notice: Subject to any disclaimer, the term of this patent is extended or adjusted under 35 U.S.C. 154(b) by 230 days.

This patent is subject to a terminal disclaimer.

(21) Appl. No.: 15/963,880

(22) Filed: Apr. 26, 2018

(65) Prior Publication Data

US 2018/0305514 A1 Oct. 25, 2018

Related U.S. Application Data

(63) Continuation of application No. 15/616,458, filed on Jun. 7, 2017, now Pat. No. 9,963,571.

(60) Provisional application No. 62/347,424, filed on Jun. 8, 2016.

(51) Int. Cl.
*C08J 9/28* (2006.01)
*C08G 73/10* (2006.01)
*B01J 13/00* (2006.01)

(52) U.S. Cl.
CPC ............ *C08J 9/28* (2013.01); *B01J 13/0091* (2013.01); *C08G 73/10* (2013.01); *C08G 73/1071* (2013.01); *C08J 2201/0482* (2013.01); *C08J 2201/0502* (2013.01); *C08J 2205/024* (2013.01); *C08J 2205/026* (2013.01); *C08J 2205/028* (2013.01); *C08J 2205/042* (2013.01); *C08J 2205/044* (2013.01); *C08J 2205/05* (2013.01); *C08J 2207/00* (2013.01); *C08J 2207/10* (2013.01); *C08J 2300/202* (2013.01); *C08J 2379/08* (2013.01)

(58) Field of Classification Search
CPC ........................................................ C08J 9/28
See application file for complete search history.

(56) References Cited

U.S. PATENT DOCUMENTS

| 5,998,569 | A | 12/1999 | Hogan et al. |
| 6,133,330 | A | 10/2000 | Weiser et al. |
| 6,355,357 | B1 | 3/2002 | Takahashi et al. |
| 6,359,107 | B1 | 3/2002 | Connell et al. |
| 6,399,669 | B1 | 6/2002 | Suzuki et al. |
| 6,576,683 | B2 | 6/2003 | Yamaguchi et al. |
| 6,777,525 | B2 | 8/2004 | Pater |
| 7,074,880 | B2 | 7/2006 | Rhine et al. |
| 7,109,287 | B2 | 9/2006 | Connell et al. |
| 7,399,439 | B2 | 7/2008 | Lee et al. |
| 7,541,388 | B2 | 6/2009 | Vazquez et al. |
| 7,691,911 | B2 | 4/2010 | Lee et al. |
| 8,697,766 | B2 | 4/2014 | Fricke et al. |
| 8,741,976 | B2 | 6/2014 | Fricke et al. |
| 8,765,230 | B1 | 7/2014 | Waldrop, III et al. |
| 8,974,903 | B2 | 3/2015 | Meador et al. |
| 9,109,088 | B2 | 8/2015 | Meador et al. |
| 9,206,298 | B2 | 12/2015 | Rodman et al. |
| 9,309,369 | B1 | 4/2016 | Meador |
| 9,434,831 | B2 | 9/2016 | Rhine et al. |
| 9,434,832 | B1 | 9/2016 | Meador |
| 9,469,732 | B2 | 10/2016 | Weber et al. |
| 9,469,739 | B2 | 10/2016 | Lee et al. |
| 9,598,548 | B2 | 3/2017 | Mueller-Cristadoro et al. |
| 9,598,861 | B2 | 3/2017 | Davis et al. |
| 9,650,487 | B1 | 5/2017 | Guo et al. |
| 9,650,550 | B2 | 5/2017 | Miyamoto et al. |
| 2004/0132845 | A1 | 7/2004 | Rhine et al. |
| 2005/0096661 | A1 | 5/2005 | Farrow et al. |
| 2010/0316550 | A1 | 12/2010 | Leventis et al. |
| 2012/0134909 | A1 | 5/2012 | Leventis et al. |

(Continued)

FOREIGN PATENT DOCUMENTS

| EP | 2974858 | 1/1916 |
| JP | 05-247208 | 9/1993 |
| JP | 3186190 | 7/2001 |

OTHER PUBLICATIONS

Holte et al., "Degree of Branching in Hyperbranched Polymers," *Acta Polymer.*, 1997, 48: 30-35.

(Continued)

*Primary Examiner* — Irina Krylova
(74) *Attorney, Agent, or Firm* — Norton Rose Fulbright US LLP

(57) ABSTRACT

A method of making an aerogel is described. The method can include obtaining a solution comprising polyamic acid and an imidazole, adding a dehydrating agent to the solution in an amount where the molar ratio of the imidazole to the dehydrating agent is 0.17:1 to 2.8:1 and reacting the solution at room temperature to 100° C. to produce a polymer matrix gel comprising a polyamic amide, and drying the polymer matrix gel to form an aerogel comprising an open-cell structured polymer matrix that includes 5 wt. % to 50 wt. % of the polyamic amide based on the total weight of the polymer aerogel.

7 Claims, 7 Drawing Sheets

(56) References Cited

U.S. PATENT DOCUMENTS

| | | |
|---|---|---|
| 2013/0020117 A1 | 1/2013 | Yamato |
| 2013/0171520 A1* | 7/2013 | Nakayama ............ H01M 4/622 |
| | | 429/211 |
| 2014/0127494 A1 | 5/2014 | Yakuwa et al. |
| 2014/0272358 A1 | 9/2014 | Meador et al. |
| 2014/0322122 A1 | 10/2014 | Leventis et al. |
| 2014/0350134 A1 | 11/2014 | Rodman et al. |
| 2015/0166729 A1 | 6/2015 | Miyamoto et al. |

OTHER PUBLICATIONS

International Search Report and Written Opinion issued in Application No. PCT/US2016/057575, dated Mar. 20, 2017.
International Search Report and Written Opinion issued in Application No. PCT/US2016/055775.
International Search Report and Written Opinion issued in Application No. PCT/IB2017/053371, dated Aug. 28, 2017.

* cited by examiner

POLYMER AEROGEL WITH IMPROVED MECHANICAL AND THERMAL PROPERTIES

CROSS-REFERENCE TO RELATED APPLICATIONS

This application is a continuation of U.S. application Ser. No. 15/616,458, filed Jun. 7, 2017, which claims priority to U.S. Provisional Application No. 62/347,424, filed Jun. 8, 2016. The referenced applications are incorporated into the present application by reference.

BACKGROUND OF THE INVENTION

A. Field of the Invention

The present disclosure relates to the field of aerogels. In particular, the invention concerns aerogels having a polymeric matrix that includes a polyamic amide polymer.

B. Description of Related Art

A gel by definition is a spongelike, three-dimensional solid network whose pores are filled with another non-gaseous substance, such as a liquid. The liquid of the gel is not able to diffuse freely from the gel structure and remains in the pores of the gel. Drying of the gel that exhibits unhindered shrinkage and internal pore collapse during drying provides materials commonly referred to as xerogels.

By comparison, a gel that dries and exhibits little or no shrinkage and internal pore collapse during drying can yield an aerogel. An aerogel is a light weight material having a relatively low density and high porosity (about 94-99%/o). Aerogels are used in a wide variety of applications such as building and construction, aerospace, catalysts, insulation, sensors, thickening agents, and the like. Aerogels made from organic polymers (e.g., polyimides or silica/polyimide blends) provide lightweight, low-density structures; however, they tend to have lower glass transition temperatures and degrade at higher temperatures (>150° C.). Attempts to improve the thermal properties of polymer aerogels have included cross-linking tri, tetra, or poly-functional units in the structure. Although cross-linked polymer aerogels (e.g., polyimide aerogels) can have some acceptable mechanical properties, they typically suffer from poor flexibility and can be difficult to manufacture, reprocess, or recycle. The lack of manufacturability and recyclability can have a negative impact on production scale-up, large scale manufacturing, conformation to irregular surfaces, or maintaining integrity in dynamic conditions.

Recent efforts to improve upon the flexibility of aerogels, while still maintaining good thermal and mechanical properties, have been focused on modifying the polymers used to create the aerogel matrix. For example, U.S. Pat. No. 9,109,088 to Meader et al., discloses cross-linked polyimide aerogels that attempt to impart bulk flexibility by using flexible linking groups in the polymer backbone. U.S. Pat. No. 9,206,298 to Rodman et al., suggests that specific properties of polyimide polymers, such as flexibility, can be influenced by incorporating certain compounds into the polyimide polymer without the formulation of covalent bonds. However, the resultant properties of the non-covalently linked compounds can be difficult to predict. For instance, non-covalently linked compounds in the polymer matrix can aggregate, which can affect homogeneity, mechanical properties, and other properties of the final aerogel.

Despite the foregoing, the above mentioned aerogels can still suffer from brittleness, poor thermal stability, and/or complicated manufacturing steps.

SUMMARY OF THE INVENTION

A discovery has been made that provides a solution to at least some of the aforementioned problems associated with polyimide aerogels. The discovery is premised on an aerogel containing a polyamic amide polymer within its polymer matrix. The aerogels of the present invention can have high branching and little to no crosslinking. It was surprisingly found that the polyamic amide aerogel of the present invention exhibits higher flexibility, higher thermal stability, and lower thermal conductivity than existing polyimide-based aerogels. The disclosed aerogels are stable and are able to resist browning at 330° C. In addition, the presence of polyamic amide in the polymer matrices of the aerogels of the present invention are easier to manufacture and/or recycle. By way of example, the methods of producing the polyamic amide aerogels of the present invention can eliminate or reduce the need for costly reagents and complex manufacturing steps, which are difficult to control.

Still further, and in certain non-limiting aspects, the polymeric matrices of the aerogels of the present invention can include macropores (pores having a size of greater than 50 nanometers (nm) in diameter), mesopores (pores having a size of 2 nm to 50 nm in diameter), or micropores (pores having a size of less than 2 nm in diameter), or any combination of such pores (e.g., macropores and mesopores, macropores and micropores, macropores, mesopores, and micropores, or mesopores and micropores). In certain preferred embodiments, the aerogels of the present invention include macropores. It is believed that the presence of macropores can further help facilitate the manufacturing of the aerogels, as macropores are larger and less likely to collapse during the drying stage of manufacturing when compared with micropores and/or mesopores. This can result in a more economically efficient and less complicated drying process, thereby allowing for a more commercially scalable process when compared with known mesoporous and/or microporous structured aerogels. Additionally, the presence of macropores may improve any one of or all of the flexibility, strength, gas permeation, and/or the strength to density ratio of the formed aerogel. In more preferred instances, the average pore size of the porous aerogel matrices of the present invention is greater than 50 nm to 5000 nm in diameter, preferably 100 nm to 2000 nm in diameter, more preferably 500 nm to 2000 nm in diameter, even more preferably 1000 nm to 1400 nm in diameter, still more preferably 1100 nm to 1300 nm in diameter, and most preferably about 1200 nm in diameter. Additionally, and in some preferred embodiments, the majority (e.g., more than 50%) of the pore volume in the aerogels of the present invention can be made up from macropores. In even further instances, over 55%, 60%, 70%, 80%, 90%, 95%, 99%, or 100% of the pore volume of the aerogels can be made up of macropores. In instances where less than 100% of the pore volume is made up of macropores, such aerogels can also include mesopores and/or micropores. This porous architecture along with the incorporation of the aforementioned polyamic amide polymers into the aerogels is believed to contribute to the improved mechanical, thermal, manufacturability, and/or recyclability properties of the aerogels of the present invention.

In one embodiment of the present invention there is disclosed an aerogel including a polyamic amide polymer. The aerogel can include an open-cell structured polymer matrix that includes the polyamic amide polymer. The polyamic amide polymer can have a repeating structural unit of:

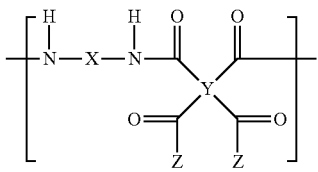

where X can be a first organic group having at least two carbon atoms, Y can be a second organic group having at least two carbon atoms, and Z can be a nitrogen containing hydrocarbon compound that includes at least one secondary nitrogen. In some instances, the above polyamic amide polymer can be 2 to 2000 repeating units in length. In one aspect, Z can be a substituted or an unsubstituted cyclic compound, a substituted or an unsubstituted aromatic compound, or combinations thereof. In another aspect, Z can further include at least one tertiary nitrogen. By way of example, Z can be an imidazole or a substituted imidazole, a triazole or a substituted triazole, a tetrazole or substituted tetrazole, a purine or a substituted purine, a pyrazole or a substituted pyrazole, or combinations thereof, and, in some instances, the secondary and tertiary nitrogen atoms are separated by at least one carbon atom. In a one aspect, Z has the following general structure:

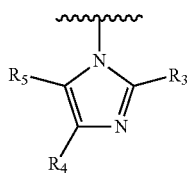

where $R_3$, $R_4$, and $R_5$ can each individually be a hydrogen (H) atom, an alkyl group, or a substituted alkyl group, an aromatic group or a substituted aromatic group, or $R_4$, and $R_5$ come together with other atoms to form a fused ring structure. In some instances, the aforementioned alkyl group or substituted alkyl group can have 1 to 12 carbon atoms, 2 to 6 carbon atoms, 3 to 8 carbon atoms, 5 to 12 carbon atoms, preferably 1 to 6 carbon atoms. In other instances, $R_3$ can be a methyl group or an ethyl group, and $R_4$ and $R_5$ can be H atoms, an alkyl group, or a substituted alkyl group. In some aspects, $R_3$ can be a methyl group, and $R_4$ and $R_5$ are H atoms. $R_3$ can be an ethyl group, and $R_4$ and $R_5$ are each individually a H, an alkyl group, or a substituted alkyl, preferably, $R_4$ is a methyl group and $R_5$ is a H atom. In some instances, the aerogel of the present invention can include at least 5 wt. % of the polyamic amide polymer based on the total weight of the polymer aerogel. In one particular instance, the aerogel of the present invention can include 5 wt. % to 50 wt. % of the polyamic amide polymer based on the total weight of the polymer aerogel. In another instance, the aerogel of the present invention can include 5 wt. % to 25 wt. % of the polyamic amide polymer based on the total weight of the polymer aerogel. The aerogel of the present invention can include 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt. % of the polyamic amide polymer based on the total weight of the polymer aerogel. In another aspect, the aerogels of the present invention can have any one, any combination of, or all of the following characteristics: (1) a density of 0.05 g/cm³ to 0.35 g/cm³; (2) a porosity of at least 50, 60, 70, 80, or 90%, preferably at least 85%, and more preferably 85% to 95%; and/or (3) a tensile strength of 100 psi to 2500 psi (0.69 MPa to 17.23 MPa) and an elongation of 0.1% to 50%, at room temperature as measured according to ASTM D882-02. (4) a compression strength of 10 psi to 500 psi (0.069 MPa to 3.45 MPa) at 10% strain at room temperature as measured according to ASTM D395-14, (5) or combinations thereof.

In another embodiment of the present invention, the polyamic amide aerogel further includes a repeating structural unit of:

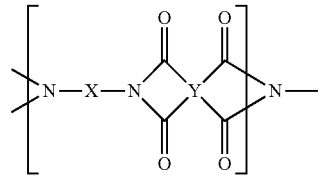

where Y can be hydroquinone dianhydride; 3,3',4,4'-biphenyltetracarboxylic dianhydride; pyromellitic dianhydride; 3,3',4,4'-benzophenone-tetracarboxylic dianhydride; 4,4'-oxydiphthalic anhydride; 3,3',4,4'-diphenylsulfone-tetracarboxylic dianhydride; 4,4'-(4,4'-isopropylidenediphenoxy)bis (phthalic anhydride); 2,2-bis(3,4-dicarboxyphenyl)propane dianhydride; 4,4'-(hexafluoroisopropylidene)diphthalic anhydride; bis(3,4-dicarboxyphenyl)sulfoxide dianhydride; polysiloxane-containing dianhydride; 2,2',3,3'-biphenyltetracarboxylic dianhydride; 2,3,2',3'-benzophenonetetraearboxylic dianhydride; 3,3',4,4'-benzophenonetetraearboxylic dianhydride; naphthalene-2,3,6,7-tetracarboxylic dianhydride; naphthalene-1,4,5,8-tetracarboxylic dianhydride; 4,4'-oxydiphthalic dianhydride; 3,3',4,4'-biphenylsulfone tetracarboxylic dianhydride; 3,4,9,10-perylene tetracarboxylic dianhydride; bis(3,4-dicarboxyphenyl)sulfide dianhydride; bis(3,4-dicarboxyphenyl)methane dianhydride: 2,2-bis(3,4-dicarboxyphenyl)propane dianhydride; 2,2-bis(3,4-dicarboxyphenyl)hexafluoropropene; 2,6-dichloronaphthalene-1,4,5,8-tetracarboxylic dianhydride; 2,7-dichloronapthalene-1,4,5,8-tetracarboxylic dianhydride; 2,3,6,7-tetrachloronaphthalene-1,4,5,8-tetracarboxylic dianhydride, phenanthrene-8,9,10-tetracarboxylic dianhydride, pyrazine-2,3,5,6-tetracarboxylic dianhydride; benzene-1,2,3,4-tetracarboxylic dianhydride; thiophene-2,3,4,5-tetracarboxylic dianhydride; or combinations thereof. In some instances, the above polyimide polymer can be 2 to 2000 repeating units in length. In one aspect, the aerogel can include a copolymer including two repeating structural units of:

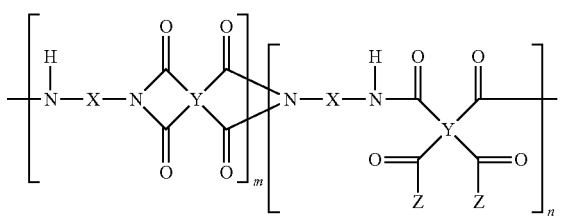

where m and n are an average number of repeat units per chain ranging from 1 to 2000. In another aspect, the copolymer can be a branched copolymer and the aerogel includes an open-cell structure.

In other embodiments, there is also disclosed a polymer having a general repeating structural unit of:

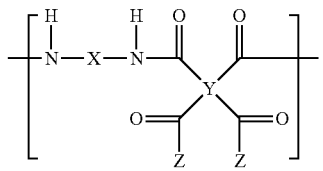

where X can be first organic group having at least two carbon atoms, Y can be a second organic group having at least two carbon atoms, and Z can be nitrogen containing hydrocarbon compound including at least one secondary nitrogen. In some aspects, the polymer can be included in a copolymer where the co-polymer includes repeating units of:

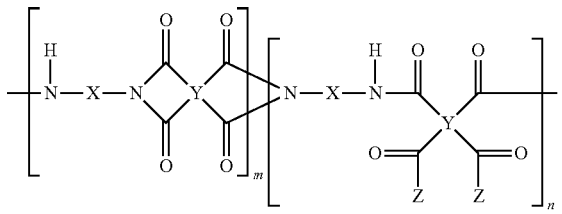

where m and n are the average number of repeat units per chain ranging from 1 to 2000. In another aspect, the polymer can be further included in an aerogel. In some aspects, any of the aforementioned polymers can have a branched polymer matrix. In some embodiments, the matrix contains less than 5% by weight of crosslinked polymers. The branched polymer matrix of the aerogel composition can include less than 1% by weight of crosslinked polymers. In some embodiments, the branched polymer matrix of the aerogel composition is not crosslinked. In some embodiments, the aerogel composition includes a hyperbranched polymer. A hyperbranched polymer is a highly branched macromolecule with three-dimensional dendritic architecture. The branched and hyperbranched polymers can include multifunctional amines and the like. In some embodiments, the branched polyimides can include a degree of branching (DB) of at least 0.2, 0.3, 0.4, 0.5, or more branches per polyimide polymer chain. In further embodiments, DB may range from 0.2 to 10. In some instances, the DB can be 0.2 to 1 or any value or range therein (e.g., 0.2, 0.3, 0.4, 0.5, 0.6, 0.7, 0.8, 0.9, or 1). In one preferred instance, the DB can be 0.2 to 0.7, 0.2 to 0.4, 0.3 to 0.4, or preferably about 0.32. In another instance, the DB can be 0.4 to 0.7, 0.4 to 0.6, 0.45 to 0.55, or preferably about 0.51. In another aspect, the DB can range from 1.2 to 8, or from 3 to 7. In a particular embodiment, the degree of branching is about 6.3.

Also disclosed is a method of making aerogels of the present invention. The method can include (a) providing at least one diamine compound to a solvent to form a solution; (b) providing at least one dianhydride compound to the solution of step (a) under conditions sufficient to form a polyamic acid solution; (c) providing a secondary amine to the polyamic acid solution; (d) subjecting the mixture of step (c) to conditions suitable to produce a polymer matrix solution including a polyamic amide; and (e) subjecting the polymer matrix solution to conditions sufficient to form an aerogel. The secondary amine of the method can be a substituted or an unsubstituted cyclic amine, a substituted or an unsubstituted aromatic amine, or combinations thereof. In some aspects, the secondary amine can include at least one secondary nitrogen and at least one tertiary nitrogen (e.g., an imidazole or a substituted imidazole, a triazole or a substituted triazole, a tetrazole or substituted tetrazole, a purine or a substituted purine, a pyrazole or a substituted pyrazole, or combinations thereof). In some instances, the nitrogen atoms are separated by at least one carbon atom. In certain aspects, the secondary amine in step (c) has the following general structure:

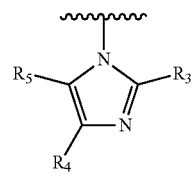

where $R_3$, $R_4$, and $R_5$ are defined above. In further aspects, step (d) of the method includes providing a dehydrating agent prior to, during, or after adding the secondary amine. Subjecting the polymer matrix solution to conditions sufficient to form an open-cell structure can include the addition of sufficient amounts of chemical curing agents for sufficient amounts of time to form a gel. The method can further include subjecting the gel to a drying step to remove the solvent and the drying step can be subcritical drying, supercritical drying or evaporative air drying, or any combination thereof. Even further, the method can include (i) subjecting the gel to conditions sufficient to freeze the solvent to form a frozen material, and (ii) subjecting the frozen material to a subcritical drying step sufficient to form an open-cell structure. In certain aspects, subjecting the polymer matrix solution to conditions sufficient to form an open-cell structure can include removing the solvent under a stream of air or subjecting the polymer matrix solution to at least one solvent exchange with a different solvent (e.g., acetone). In other aspects, the method can also include a multifunctional amine.

In instances where there is a desire to incorporate macropores into the polymeric matrix of any one of the aerogels of the present invention, such macropores can be formed by selecting processing conditions that favor the formation of macropores vs mesopores and/or micropores. The amount of macropores can be adjusted by implementing any one of, any combination of, or all of the following variables: (1) the polymerization solvent; (2) the polymerization temperature; (3) the polymer molecular weight; (4) the molecular weight distribution; (5) the copolymer composition; (6) the amount of branching; (7) the amount of crosslinking; (8) the method of branching; (9) the method of crosslinking; (10) the method used in formation of the gel; (11) the type of catalyst used to form the gel; (12) the chemical composition of the catalyst used to form the gel; (13) the amount of the catalyst used to form the gel; (14) the temperature of gel formation; (15) the type of gas flowing over the material during gel formation; (16) the rate of gas flowing over the material during gel formation; (17) the pressure of the atmosphere during gel formation; (18) the removal of dissolved gasses during gel formation; (19) the presence of solid additives in the resin during gel formation; (20) the amount of time of the gel formation process; (21) the substrate used for gel formation; (22) the type of solvent or solvents used in each step of the solvent exchange process; (23) the composition of solvent or solvents used in each step of the solvent exchange process; (24) the amount of time used in each step of the solvent exchange process; (25) the dwell time of the part in each step of the solvent exchange process; (26) the rate of flow of the solvent exchange solvent; (27) the type of flow of the solvent exchange solvent; (28) the agitation rate of the solvent exchange solvent; (29) the temperature used in each step of the solvent exchange process; (30) the ratio of the volume of solvent exchange solvent to the volume of the part; (31) the method of drying; (32) the temperature of each step in the drying process; (33) the pressure in each step of the drying process; and/or (34) the solvents used in each step of the drying process. In one preferred and non-limiting aspect, the formation of macropores vs smaller mesopores and micropores can be primarily controlled by controlling the polymer/solvent dynamics during gel formation. By doing so, the pore structure can be controlled, and the quantity and volume of macroporous, mesoporous, microporous cells can be controlled. In one instance, this can be done by adding a curing agent to the solution to reduce the solubility of polymers formed in the solution and to form macropores in the gel matrix, the formed macropores containing liquid from the solution. For example, a curing additive that reduces the resultant polymer solubility, such as 1,4-diazabicyclo[2.2.2]octane, can produce a polymer matrix containing a higher number of macropores compared to another curing additive that improves the resultant polyimide solubility, such as triethylamine. In another example, using the same dianhydride such as biphenyl-tetracarboxylic acid dianhydride (BPDA), but increasing the ratio of rigid amines incorporated into the polymer backbone such as p-phenylenediamine (p-PDA) as compared to more flexible diamines such as 4,4'-oxydianiline (ODA), the formation of macropores as compared to smaller mesopores and micropores can be controlled.

The aerogel of the present invention can be included in articles of manufacture. Articles of manufacture can be a thin film, a monolith, a wafer, a blanket, a core composite material, a substrate for radiofrequency antenna, a substrate for a sunshield, a substrate for a sunshade, a substrate for radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus, or any combination thereof. Preferably, the article of manufacture is an antenna, a sunshield or sunscreen, a radome, a blanket, or a filter.

The aerogel of the present invention can be used to filter a fluid in need thereof. A filtration method using the aerogel of the present invention can include contacting a feed fluid with the aerogel of the present invention under conditions sufficient to remove at least a portion of the impurities and/or desired substances from the feed fluid and produce a filtrate. In one aspect, the feed fluid is a liquid, a gas, a supercritical fluid, or a mixture thereof. The feed fluid can include water or alternatively can be a non-aqueous liquid. When the feed fluid is a non-aqueous liquid, it can be an oil, a solvent, or combinations thereof. In a specific aspect, the feed fluid is a solvent and the solvent can be an organic solvent. In another specific aspect, the feed fluid is an emulsion and the emulsion can be a water-oil emulsion, an oil-water emulsion, a water-solvent emulsion, a solvent-water emulsion, an oil-solvent emulsion, or a solvent-oil emulsion. The feed fluid can also be a biological fluid and the biological fluid can be blood, plasma, or both. Additionally, the feed fluid can be a gas and the gas can include air, nitrogen, oxygen, an inert gas, or mixtures thereof. The goal of the method of filtering a fluid using the disclosed aerogels is to obtain a filtrate that is substantially free of impurities and/or a desired substance. In another embodiment, a filtration system is disclosed that includes (a) an aerogel of the present invention, and (b) a separation zone in fluid communication with the aerogel, a feed fluid and a filtrate.

Also disclosed in the context of the present invention are embodiments 1 to 64. Embodiment 1 is an aerogel comprising an open-cell structured polymer matrix that includes a polyamic amide polymer. Embodiment 2 is the aerogel of embodiment 1, wherein the polyamic amide polymer in the matrix has a repeating structural unit of:

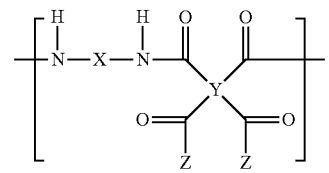

where X is a first organic group having at least two carbon atoms, Y is a second organic group having at least two carbon atoms, and Z is a nitrogen containing hydrocarbon compound comprising at least one secondary nitrogen. Embodiment 3 is the aerogel of claim 2, wherein Z is a substituted or an unsubstituted cyclic compound, a substituted or an unsubstituted aromatic compound, or combinations thereof. Embodiment 4 is the aerogel of any one of embodiments 2 to 3, wherein Z further comprises at least one tertiary nitrogen. Embodiment 5 is the aerogel of embodiment 4, wherein Z is an imidazole or a substituted imidazole, a triazole or a substituted triazole, a tetrazole or substituted tetrazole, a purine or a substituted purine, a pyrazole or a substituted pyrazole, or combinations thereof. Embodiment 6 is the aerogel of embodiment 4, wherein the secondary and tertiary nitrogen atoms are separated by at least one carbon atom. Embodiment 7 is the aerogel of embodiment 6, wherein Z has the following general structure:

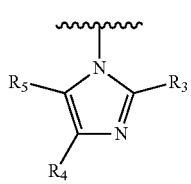

where $R_3$, $R_4$, and $R_5$ are each individually a hydrogen (H) atom, an alkyl group, or a substituted alkyl group, an aromatic group or a substituted aromatic group, or $R_4$, and $R_5$ come together with other atoms to form a fused ring structure. Embodiment 8 is the aerogel of embodiment 7, wherein the alkyl group or a substituted alkyl group has 1 to 12 carbon atoms, 2 to 6 carbon atoms, 3 to 8 carbon atoms, 5 to 12 carbon atoms, preferably 1 to 6 carbon atoms. Embodiment 9 is the aerogel of any one of embodiments 7 to 8, wherein $R_3$ is a methyl group or an ethyl group and $R_4$ and $R_5$ are H atoms, an alkyl group, or a substituted alkyl group. Embodiment 10 is the aerogel of embodiment 9, wherein $R_3$ is a methyl group, and $R_4$ and $R_5$ are H atoms. Embodiment 11 is the aerogel of embodiment 9, wherein $R_3$ is an ethyl group and $R_4$ and $R_5$ are each individually a H atom, an alkyl group, or a substituted alkyl, preferably, $R_4$ is a methyl group and $R_5$ is a H atom. Embodiment 12 is the aerogel of any one of embodiments 1 to 11, further comprising a polyimide polymer. Embodiment 13 is the aerogel of embodiment 12, wherein the polyimide polymer has a repeating structural unit of:

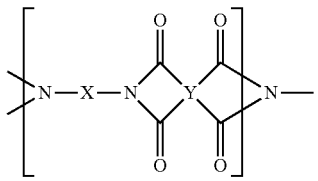

Embodiment 14 is the aerogel of any one of embodiments 1 to 13, wherein the Y is derived from hydroquinone dianhydride; 3,3',4,4'-biphenyltetracarboxylic dianhydride; pyromellitic dianhydride; 3,3',4,4'-benzophenone-tetracarboxylic dianhydride; 4,4'-oxydiphthalic anhydride; 3,3',4,4'-diphenylsulfone-tetracarboxylic dianhydride; 4,4'-(4,4'-isopropylidenediphenoxy)bis(phthalic anhydride); 2,2-bis(3,4-dicarboxyphenyl)propane dianhydride; 4,4'-(hexafluoroisopropylidene)diphthalic anhydride; bis(3,4-dicarboxyphenyl)sulfoxide dianhydride; polysiloxane-containing dianhydride; 2,2',3,3'-biphenyltetracarboxylic dianhydride; 2,3,2',3'-benzophenonetetraearboxylic dianhydride; 3,3',4,4'-benzophenonetetraearboxylic dianhydride; naphthalene-2,3,6,7-tetracarboxylic dianhydride; naphthalene-1,4,5,8-tetracarboxylie dianhydride; 4,4'-oxydiphthalic dianhydride; 3,3',4,4'-biphenylsulfone tetracarboxylic dianhydride; 3,4,9,10-perylene tetracarboxylic dianhydride; bis(3,4-dicarboxyphenyl)sulfide dianhydride; bis(3,4-dicarboxyphenyl)methane dianhydride; 2,2-bis(3,4-dicarboxyphenyl)propane dianhydride; 2,2-bis(3,4-dicarboxyphenyl)hexafluoropropene; 2,6-dichloronaphthalene-1,4,5,8-tetracarboxylic dianhydride; 2,7-dichloronapthalene-1,4,5,8-tetracarboxylic dianhydride; 2,3,6,7-tetrachloronaphthalene-1,4,5,8-tetracarboxylic dianhydride; phenanthrene-8,9,10-tetracarboxylic dianhydride; pyrazine-2,3,5,6-tetracarboxylic dianhydride; benzene-1,2,3,4-tetracarboxylic dianhydride; thiophene-2,3,4,5-tetracarboxylic dianhydride; or combinations thereof. Embodiment 15 is the aerogel of any one of embodiments 1 to 14, wherein the aerogel is a copolymer comprising two repeating structural units of:

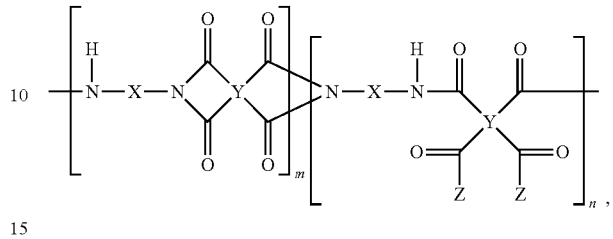

where m and n are average number of repeat units per chain ranging from 1 to 2000. Embodiment 16 is the aerogel of embodiment 15, wherein the copolymer is a branched copolymer. Embodiment 17 is the aerogel of any one of embodiments 1 to 16, wherein the polymer matrix comprises at least 5 wt. %, preferably 5 wt. % to 50 wt. %, or more preferably 5 wt. % to 25 wt. %, of the polyamic amide polymer. Embodiment 18 is the aerogel of any one of embodiments 1 to 16, wherein the polymer matrix has an average pore size of greater than 50 nanometers (nm) to 5000 nm in diameter, preferably 100 nm to 2000 nm in diameter, more preferably 500 nm to 2000 nm in diameter, even more preferably 1000 nm to 1400 nm in diameter, still more preferably 1100 nm to 1300 nm in diameter, and most preferably about 1200 nm in diameter. Embodiment 19 is the aerogel of embodiment 18, wherein the polymer matrix has an average pore size of 1000 nm to 1400 nm in diameter. Embodiment 20 is the aerogel of embodiment 19, wherein the polymer matrix has an average pore size of 1100 nm to 1300 nm, preferably about 1200 nm in diameter.

Embodiment 21 is a polymer having a general repeating structural unit of:

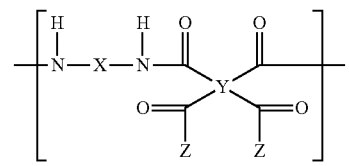

where X is first organic group having at least two carbon atoms, Y is second organic group having at least two carbon atoms, Z is nitrogen containing hydrocarbon compound comprising at least one secondary nitrogen. Embodiment 22 is the polymer of embodiment 21, wherein the polymer is comprised in a copolymer. Embodiment 23 is the polymer of embodiment 22, wherein the co-polymer comprises repeating units of:

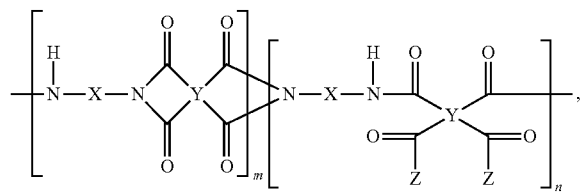

where m and n are average number of repeat units per chain ranging from 1 to 2000. Embodiment 24 is the polymer of any one of embodiments 21 to 23, further comprised in an aerogel of any one of claims 1 to 23.

Embodiment 25 is a method of making the aerogel of any one of embodiments 1 to 20, the method comprising: (a) providing at least one diamine compound to a solvent to form a solution; (b) providing at least one dianhydride compound to the solution of step (a) under conditions sufficient to form a polyamic acid solution; (c) providing a secondary amine to the polyamic acid solution; (d) subjecting the solution of step (c) to conditions suitable to produce a polymer matrix solution comprising a polyamic amide; and (e) subjecting the polymer matrix solution to conditions sufficient to form an aerogel comprising an open-cell structured polymer matrix that includes the polyamic amide. Embodiment 26 is the method of embodiment 25, wherein the secondary amine is a substituted or an unsubstituted cyclic amine, a substituted or an unsubstituted aromatic amine, or combinations thereof. Embodiment 27 is the method of any one of embodiments 25 to 26, wherein secondary amine further comprises at least one secondary nitrogen and at least one tertiary nitrogen. Embodiment 28 is the method of embodiment 27, wherein the secondary amine is imidazole or a substituted imidazole, a triazole or a substituted triazole, a tetrazole or substituted tetrazole, a purine or a substituted purine, a pyrazole or a substituted pyrazole, or combinations thereof. Embodiment 29 is the method of embodiment 28, wherein the nitrogen atoms are separated by at least one carbon atom. Embodiment 30 is the method of any one of embodiments 25 to 29, wherein the secondary amine in step (c) has the following general structure:

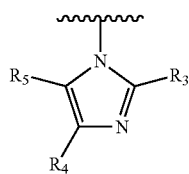

where $R_3$, $R_4$, and $R_5$ are each individually a hydrogen, an alkyl group, or a substituted alkyl group, or an aromatic group or a substituted group, or $R_4$, and $R_5$ come together with other atoms to form a cyclic structure. Embodiment 31 is the method of embodiment 30, wherein the alkyl group has 1 to 12 carbon atoms, 2 to 6 carbon atoms, 3 to 8 carbon atoms, 5 to 12 carbon atoms, preferably 1 to 6 carbon atoms. Embodiment 32 is the method of any one of embodiments 30 to 31, wherein $R_3$ is a methyl group or an ethyl group, and $R_4$ and $R_5$ are H atoms, an alkyl group, or a substituted alkyl. Embodiment 33 is the method of embodiment 32, wherein $R_3$ is a methyl group and $R_4$ and $R_5$ are H atoms. Embodiment 34 is the method of embodiment 32, wherein $R_3$ is an ethyl group and $R_4$ and $R_5$ are each individually a H atom, an alkyl group, or a substituted alkyl, preferably, $R_4$ is a methyl group and $R_5$ is a H atom. Embodiment 35 is the method of any one of embodiments 25 to 34, wherein step (d) comprises providing a dehydrating agent prior to, during, or after, adding the secondary amine. Embodiment 36 is the method of any one of embodiments 25 to 35, wherein subjecting the polymer matrix solution to conditions sufficient to form an aerogel comprises the addition of sufficient amounts of chemical curing agents for sufficient amounts of time to form a gel. Embodiment 37 is the method of embodiment 36, further comprising subjecting the gel to a drying step to remove the solvent. Embodiment 38 is the method of embodiment 37, wherein the drying step is subcritical drying or supercritical drying. Embodiment 39 is the method of embodiment 38, further comprising: (i) subjecting the gel to conditions sufficient to freeze the solvent to form a frozen material; and (ii) subjecting the frozen material to a subcritical drying step sufficient to form an open-cell structure. Embodiment 40 is the method of embodiment 37, wherein the drying step is evaporative drying. Embodiment 41 is the method of any one of embodiments 25 to 40, wherein subjecting the polymer matrix solution to conditions sufficient to form an open-cell structure comprises removing the solvent under a stream of air. Embodiment 42 is the method of embodiment 41, further comprising subjecting the polymer matrix solution to at least one solvent exchange with a different solvent. Embodiment 43 is the method of embodiment 42, wherein at least one solvent exchange is performed with acetone.

Embodiment 44 is an article of manufacture comprising the aerogel of any one of embodiments 1 to 20 or the polymer of any one of embodiments 21 to 24. Embodiment 45 is the article of manufacture of embodiment 44, wherein the article of manufacture is a thin film, monolith, wafer, blanket, core composite material, a substrate for radiofrequency antenna, substrate for a sunshield, a substrate for a sunshade, a substrate for radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus, or any combination thereof. Embodiment 46 is the article of manufacture of embodiment 45, wherein the article of manufacture is an antenna. Embodiment 47 is the article of manufacture of embodiment 45, wherein the article of manufacture is a sunshield or sunscreen. Embodiment 48 is the article of manufacture of embodiment 45, wherein the article of manufacture is a radome. Embodiment 49 is the article of manufacture of embodiment 45, wherein the article of manufacture is a filter.

Embodiment 50 is a method of filtering a fluid comprising impurities and/or desired substances, the method comprising contacting a feed fluid with the aerogel of any one of embodiments 1 to 20 under conditions sufficient to remove at least a portion of the impurities and/or desired substances from the feed fluid and produce a filtrate. Embodiment 51 is the method of embodiment 50, wherein the feed fluid is a liquid, a gas, a supercritical fluid, or a mixture thereof. Embodiment 52 is the method of embodiment 51, wherein the feed fluid comprises water. Embodiment 53 is the method of embodiment 52, wherein the feed fluid is a non-aqueous liquid. Embodiment 54 is the method of embodiment 53, wherein the non-aqueous liquid is an oil, a solvent, or combinations thereof. Embodiment 55 is the method of embodiment 54, wherein the feed fluid is a solvent. Embodiment 56 is the method of embodiment 55, wherein the solvent is an organic solvent. Embodiment 57 is the method of any one of embodiments 50 to 56, wherein the feed fluid is an emulsion. Embodiment 58 is the method of embodiment 57, wherein the emulsion is a water-oil emulsion, an oil-water emulsion, a water-solvent emulsion, a solvent-water emulsion, an oil-solvent emulsion, or a solvent-oil emulsion. Embodiment 59 is the method of embodiment 50, wherein the feed fluid is a biological fluid. Embodiment 60 is the method of embodiment 59, wherein the biological fluid is blood, plasma, or both. Embodiment 61 is the method of embodiment 50, wherein the feed fluid is a gas. Embodiment 62 is the method of embodiment 61, wherein the gas comprises air, nitrogen, oxygen, an inert gas, or mixtures thereof. Embodiment 63 is the method of any one of embodiments 50 to 62, wherein the filtrate is substantially free of impurities and/or a desired substance.

Embodiment 64 is a filtration system comprising: (a) the aerogel of any one of embodiments 1 to 20; and (b) a separation zone in fluid communication with the aerogel, a feed fluid and a filtrate.

The following includes definitions of various terms and phrases used throughout this specification.

The term "aerogel" refers to a class of materials that are generally produced by forming a gel, removing a mobile interstitial solvent phase from the pores, and then replacing it with a gas or gas-like material. By controlling the gel and evaporation system, density, shrinkage, and pore collapse can be minimized. As explained above, aerogels of the present invention can include micropores, mesopores, or macropores, or any combination thereof. The amount of micropores, mesopores, and/or macropores in any given aerogel of the present invention can be modified or tuned as desired. In certain preferred aspects, however, the aerogels can include macropores such that at least 5%, 10%, 15%, 20%, 25%, 30%, 35%, 40%, 45%, 50%, 55%, 60%, 65%, 70%, 75%, 80%, 85%, 90%, 95%, or 100% of the aerogel's pore volume can be made up of macropores. In some embodiments, the aerogels of the present invention can have low bulk densities (about 0.25 g/cm$^3$ or less, preferably about 0.01 to 0.5 g/cm$^3$), high surface areas (generally from about 10 to 1,000 m$^2$/g and higher, preferably about 50 to 1000 m$^2$/g), high porosity (about 80% and greater, preferably greater than about 85%), and/or relatively large pore volume (more than about 1.0 mL/g, preferably about 1.2 mL/g and higher).

The presence of macropores, mesopores, and/or micropores in the aerogels of the present invention can be determined by mercury intrusion porosimetry (MIP) and/or gas physisorption experiments. In a preferred instance, the MIP test used in the Examples section can be used (i.e., American Standard Testing Method (ASTM) D4404-10, Standard Test Method for Determination of Pore Volume and Pore Volume Distribution of Soil and Rock by Mercury Intrusion Porosimetry).

The terms "impurity" or "impurities" refers to unwanted substances in a feed fluid that are different than a desired filtrate and/or are undesirable in a filtrate. In some instances, impurities can be solid, liquid, gas, or supercritical fluid. In some embodiments, an aerogel can remove some or all of an impurity.

The term "desired substance" or "desired substances" refers to wanted substances in a feed fluid that are different than the desired filtrate. In some instances, the desired substance can be solid, liquid, gas, or supercritical fluid. In some embodiments, an aerogel can remove some or all of a desired substance.

The term "radio frequency (RF)" refers to the region of the electromagnetic spectrum having wavelengths ranging from $10^{-4}$ to $10^7$ m.

The term "supercritical fluid" refers to any substance at a temperature and pressure above its critical point. A supercritical fluid can diffuse through solids like a gas, and dissolve materials like a liquid. Additionally, close to the critical point, small changes in pressure or temperature result in large changes in density.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The term "substantially" and its variations are defined to include ranges within 10%, within 5%, within 1%, or within 0.5%.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The polyamic amide aerogel of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the polyamic amide aerogel of the present invention is that it has improved mechanical and/or thermal properties due to the presence of a polyamic amide polymer in the aerogel matrix.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
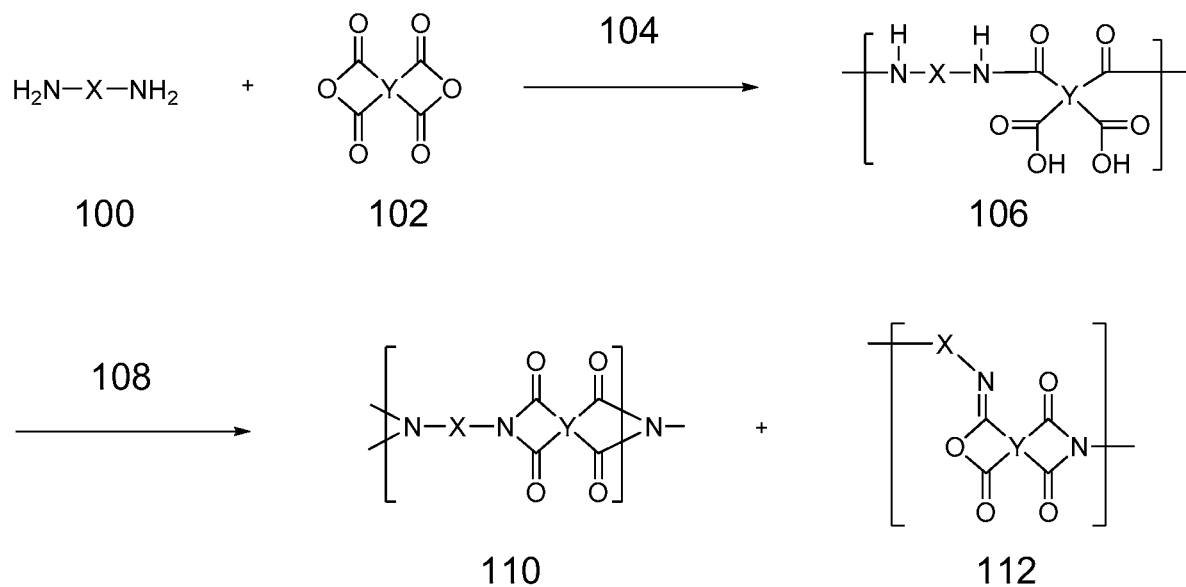
FIG. 1 is a reaction schematic showing the synthesis of a polyimide polymer including polyisoimide.

While the invention is susceptible to various modifications and alternative forms, specific embodiments thereof are shown by way of example in the drawings and may herein be described in detail. The drawings may not be to scale.

DETAILED DESCRIPTION OF THE INVENTION

A discovery has been made that provides a polyamic amide containing aerogel with improved mechanical and thermal properties as well as improved manufacturability and processability over conventional polyimide aerogels. These and other non-limiting aspects of the present invention are discussed in further detail in the following sections.

A. Polyamic Amide Polymer

In a particular embodiment, the aerogel of the current invention includes a polymeric matrix having a polyamic amide polymer. The presence of the polyamic amide polymer surprisingly provides the aerogel with many improved properties over conventional polyimide aerogels. In some embodiments, the polymer aerogels contain little to no polyisoimide byproduct in the polymer matrix. In general, polyamic amide polymers include two amides that are part of the polymer backbone, and at least two additional amides that are not part of the polymer backbone. The at least two amides not part of the polymer backbone are free to rotate and interact with functional groups within and not within the polymer backbone. This structural arrangement may help to reduce the linearity and stiffness of the polymer backbone in a way to benefit the flexibility of the resultant aerogel while retaining or even increasing mechanical and thermal properties. The amides not part of the polymer backbone can also be variably functionalized with different amines to provide further opportunity for chemical interactions and the installation of further functionality to further affect aerogel properties. Similar to polyimide polymer, polyamic amide polymer can be considered an AA-BB type polymer because usually two different classes of monomers are used to produce the polyamic amide polymer. However polyamic amides are different than polyimides in that the intermediate polyamic acid derivative can be reacted with a free amine instead of cyclodehydration to form the polyimide. Polyamic amides can also be prepared from AB type monomers. For example, an aminodicarboxylic acid monomer can be polymerized to form an AB type intermediate polyamic acid that can be treated with a free amine under condition to form a polyamic amide. Monoamines and/or mono anhydrides can be used as end capping agents if desired.

The polyamic amide of the current invention has a repeating structural unit of:

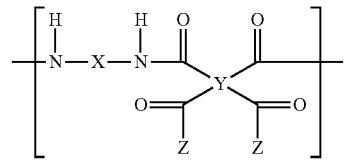

where X can be a first organic group having at least two carbon atoms, Y can be a second organic group having at least two carbon atoms, and Z can be a nitrogen containing hydrocarbon compound comprising at least one secondary nitrogen. Z can be a substituted or an unsubstituted cyclic compound, a substituted or an unsubstituted aromatic compound, or combinations thereof. In some instances, the above polyamic amide polymer can be 2 to 2000 repeating units in length. Z can also include at least one tertiary nitrogen, and, in some instances, the secondary and tertiary nitrogen atoms are separated by at least one carbon atom. Non-limiting examples of Z compounds include an imidazole or a substituted imidazole, a triazole or a substituted triazole, a tetrazole or substituted tetrazole, a purine or a substituted purine, a pyrazole or a substituted pyrazole, or combinations thereof. More specifically, Z can have the following general structure:

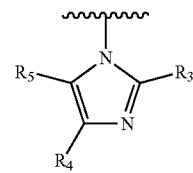

where $R_3$, $R_4$, and $R_5$ can be each individually a hydrogen (H) atom, an alkyl group, or a substituted alkyl group, an aromatic group or a substituted aromatic group, or $R_4$, and $R_5$ come together with other atoms to form a fused ring structure. In some instances, the imidazole can undergo electrophilic aromatic acylation to bond a carbon atom of the imidazole with the carbonyl carbon bonded to Y. An alkyl group can be a straight or branched chain alkyl having 1 to 20 carbon atoms and includes, for example, methyl, ethyl, propyl, isopropyl, butyl, isobutyl, secondary butyl, tertiary butyl, pentyl, isopentyl, neopentyl, hexyl, heptyl, octyl, 2-ethylhexyl, 1,1,3,3-tetramethylbutyl, nonyl, decyl, dodecyl, tetradecyl, hexadecyl, octadecyl, and eicosyl. A substituted alkyl group can be any of the aforementioned alkyl groups that are additionally substituted with an heteroatom, such as a halogen (F, Cl, Br, I), boron, oxygen, nitrogen, sulfur, silicon, etc. An aromatic group can be any aromatic hydrocarbon group having from 6 to 20 carbon atoms of the monocyclic, polycyclic or condensed polycyclic type, and include, for example, phenyl, biphenyl and naphthyl. A substituted aromatic group can be any of the aforementioned aromatic groups that are additionally substituted with an heteroatom, such as a halogen (F, Cl, Br, I), boron, oxygen, nitrogen, sulfur, silicon, etc. A fused ring structure includes, for example, benzimidazole. In some instances, the aforementioned alkyl group or substituted alkyl group has 1 to 12 carbon atoms, 2 to 6 carbon atoms, 3 to 8 carbon atoms, 5 to 12 carbon atoms, preferably 1 to 6 carbon atoms. In other instances, $R_3$ can be a methyl group or an ethyl group and $R_4$ and $R_5$ are H atoms, an alkyl group, or a substituted alkyl group. In some aspects, $R_3$ can be a methyl group, and $R_4$ and $R_5$ are H atoms, and, in other aspects, $R_3$ can be an ethyl group and $R_4$ and $R_5$ are each individually a H, an alkyl group, or a substituted alkyl, preferably, $R_4$ is a methyl group and $R_5$ is a H atom. The polyamic amide can have the following general structure when Z is an imidazole or substituted imidazole:

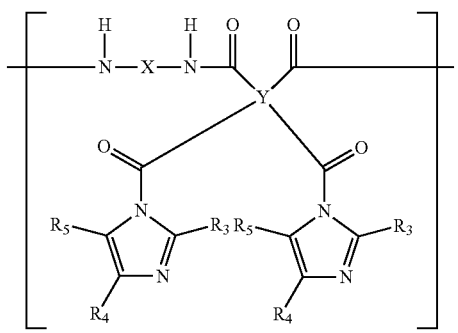

In a particular embodiment, the polyamic amide polymer is:

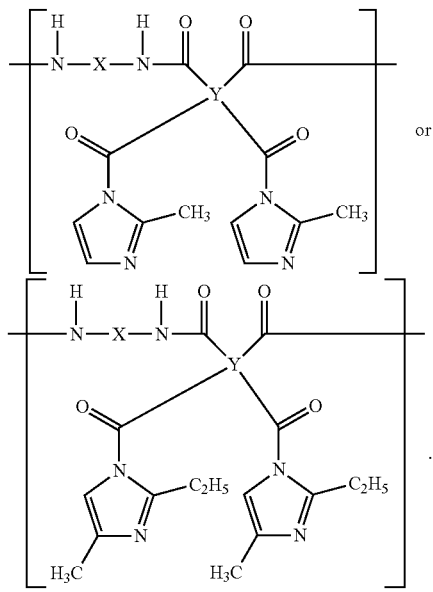

The polyamic amide polymer can be synthesized by several methods. In one method of synthesizing the aromatic polyamic amide polymer, a solution of the aromatic diamine in a polar aprotic solvent, such as N-methylpyrrolidone (NMP), is prepared. A di-acid monomer, usually in the form of a dianhydride, is added to this solution, but the order of addition of the monomers can be varied. For example, the di-acid monomer can be added first, or the di-acid monomer and the diamine can be simultaneously added. The resulting polycondensation reaction forms a polyamic acid, also referred to as a polyamide acid, which is a polyamic amide precursor. Other polyamic amide precursors are known, including polyamic ester, polyamic acid salts, polysilyl esters, and polyisoimides. Once the polyamic acid or derivative is formed, it can be further reacted with a nitrogen containing hydrocarbon and dehydration agent under conditions to form the polyamic amide polymer. The nitrogen containing hydrocarbon and dehydration agent together or separately may be present in solution, added during the reaction process, or added in a separate step as appropriate so the nitrogen containing hydrocarbon can be incorporated into the polyamic amide polymer by an amidation process. "Amidation" is defined as the conversion of a polyamic amide precursor into an polyamic amide. In some aspects, the molar ratio of a nitrogen contain hydrocarbon to anhydride or diamine monomer can be from 0.031:1 to 128:1, 0.12:1 to 32:1, or specifically from 0.5:1 to 8:1. The molar ratio of nitrogen containing hydrocarbon to dehydration agent can be from 01:1 to 44:1, 0.04:1 to 11:1, or specifically from 0.17:1 to 2.8:1. In general, amidation reactions, such as the reaction between a carboxylic acid and amine to form a amide bond are thermodynamically favorable, but often suffer from a high activation energy due acid-base chemistry between the carboxylic acid and amine. To overcome the high activation energy, amidation reactions often rely on non-acidic activation of the acid derivative. Activation can be achieved using a dehydration agent. For example, the activated acid derivative can be mixed with an acetic anhydride such as trifluoroacetic anhydride (TFAA) and trifluoroacetic acid (TFA) in toluene. In a preferred embodiment, amidation to form polyamic amide polymer can be achieved using an organic compound having a at least one secondary amine. In one particular instance, an organic compound having a secondary and a tertiary amine, such as 2-methyl imidazole or 2-ethyl-4-methylimidazole can be used. The dehydration agent can include acetic anhydride, propionic anhydride, n-butyric anhydride, benzoic anhydride, trifluoroacetic anhydride, oxalyl chloride, thionyl chloride, phosphorus trichloride, dicyclohexylcarbodiimide, 1,1'-carbonyldiimidazole (CDI), di-tert-butyl dicarbonate ($Boc_2O$), or combinations thereof.

B. Polyimide Polymer

In another embodiment, the polymeric matrices of the aerogels of the present invention can also include a polyimide polymer. Polyimides polymers can be used in production of aerogels with many desirable properties. In general, polyimide polymers include a nitrogen atom in the polymer backbone, where the nitrogen atom is connected to two carbonyl carbons, such that the nitrogen atom is somewhat stabilized by the adjacent carbonyl groups. A carbonyl group includes a carbon, referred to as a carbonyl carbon, which is double bonded to an oxygen atom. Polyimides are usually considered an AA-BB type polymer because usually two different classes of monomers are used to produce the polyimide polymer. Polyimides can also be prepared from AB type monomers. For example, an aminodicarboxylic acid monomer can be polymerized to form an AB type polyimide. Monoamines and/or mono anhydrides can be used as end capping agents if desired.

The polyimide of the current invention has a repeating structural unit of:

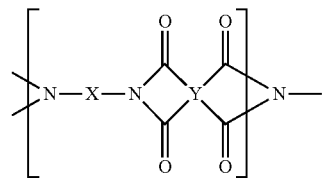

where X can be a first organic group having at least two carbon atoms and Y can be a second organic group having at least two carbon atoms, where X and Y are defined above. In some instances, the above polyimide polymer can be 2 to 2000 repeating units in length.

Polyimides may be synthesized by several methods. In one method of synthesizing aromatic polyimides, a solution of the aromatic diamine in a polar aprotic solvent, such as N-methylpyrrolidone (NMP), is prepared. A di-acid monomer, usually in the form of a dianhydride, is added to this solution, but the order of addition of the monomers can be varied. For example, the di-acid monomer can be added first, or the di-acid monomer and the diamine can be simultaneously added. The resulting polycondensation reaction forms a polyamic acid, also referred to as a polyamide acid, which is a polyimide precursor. Other polyimide precursors are known, including polyamic ester, polyamic acid salts, polysilyl esters, and polyisoimides. This process description may be applicable to one or more polyimide precursor solutions. Alternatively the polyimide can be formed from the forward or reverse mixing of amines and anhydrides under appropriate dehydrating conditions and/or catalysts where the lifetime of the polyamic acid intermediate is very short or possibly not even detectable. The polyimide polymer is formed by a cyclodehydration reaction, also called imidization. "Imidization" is defined as the conversion of a polyimide precursor into an imide. Alternatively, polyamic acids or other precursors may be converted in solution to polyimides by using a chemical dehydrating agent, catalyst, and/or heat.

C. Highly Branched Non-Crosslinked Aerogel

In some aspects, the present disclosure provides an aerogel that includes an open-cell structure and a branched polymer matrix. In some embodiments, the matrix contains less than 5%, less than 4%, less than 3%, or less than 2% by weight of crosslinked polymers. The branched polymer matrix of the aerogel composition can include less than 1% by weight of crosslinked polymers. In some embodiments, the branched polymer matrix of the aerogel composition is not crosslinked.

The characteristics or properties of the final aerogel can be impacted by the choice of monomers used to produce the aerogel. Factors to be considered when selecting monomers include the properties of the final aerogel, such as the flexibility, thermal stability, coefficient of thermal expansion (CTE), coefficient of hydroscopic expansion (CHE) and any other properties specifically desired, as well as cost. Often, certain important properties of a polymer for a particular use can be identified. Other properties of the polymer may be less significant, or may have a wide range of acceptable values; so many different monomer combinations could be used. The aerogel composition of the current invention includes a high degree of branching and low degree of crosslinking, which has a positive effect the polymers' mechanical properties. A highly crosslinked polymer is typically considered a thermoset polymer, which is a polymer that has been irreversibly cured. The polymers presented herein display a low degree of crosslinking, thereby more closely resembling a thermoplastic. As such, the polymer may be re-shaped and re-cycled. In some aspects, the current aerogel composition includes polyamic amide polymer containing a large amount of trifunctional, tetrafunctional, or multifunctional monomer, specifically triamine monomer, yet displays little to no crosslinking.

Other factors to be considered in the selection of monomers include the expense and availability of the monomers chosen. Commercially available monomers that are produced in large quantities generally decrease the cost of producing polymer materials since such monomers are in general less expensive than monomers produced on a lab scale and pilot scale. Additionally, the use of commercially available monomers can improve the overall reaction efficiency because additional reactions are not required to produce a monomer, which is then incorporated into the polymer.

The highly branched aerogels of the current invention may contain imide co-monomer units that include relatively rigid molecular structures such as aromatic/cyclic moieties. These typical structures may often be relatively linear and stiff. The linearity and stiffness of the cyclic/aromatic backbone reduces segmental rotation and allows for molecular ordering which results in lower coefficient of thermal expansion than many thermoplastic polymers having more flexible chains. In addition, the intermolecular associations of polyimide chains provide resistance to most solvents, which tends to reduce the solubility of many typical polyimide polymers in many solvents. In some aspects, the use of more aliphatic monomers can reduce the stiffness of the aerogel, if desired.

In some embodiments, the aerogel composition can include a hyperbranched polymer. A hyperbranched polymer is a highly branched macromolecule with three-dimensional dendritic architecture. Hence, the molecular weight of a hyperbranched polymer is not a sufficient parameter that characterizes these polymers. Since the number of possible structures becomes very large as the polymerization degree of macromolecules increases, there is a need to characterize also this aspect of hyperbranched polymers. Thus, the term degree of branching (DB) was introduced as a quantitative measure of the branching perfectness for hyperbranched polymers. In some embodiments, the branched polyimides of the current aerogels can include a degree of branching (DB) of at least 0.2, 0.3, 0.4, 0.5, or more branches per polyimide polymer chain. In further embodiments, DB may range from 0.2 to 10, preferably from 1.2 to 8, or more preferably from 3 to 7. In a particular embodiment, the degree of branching is 6.3. Alternatively, the DB may range from 0.2 to 5, preferably 0.2 to 1, more preferably 0.2 to 0.6, or even more preferably about 0.2 to 0.4, or about 0.32. In another aspect, the DB may range from 0.3 to 0.7, 0.4 to 0.6, or about 0.51. In some aspects, DB may be represented by the following equation:

$$\frac{2Q_T}{3 - Q_T + 3Q_M - 3p}$$

where p is the extent of reaction, and $Q_T$ and $Q_M$ are parameters representing the fractions of monofunctional and trifunctional monomers at the beginning of the reaction according to the following equations:

$$Q_T = \frac{3N_T}{N_M + 2N_B + 3N_T}$$

$$Q_M = \frac{N_M}{N_M + 2N_B + 3N_T}$$

where $N_T$, $N_M$, and $N_B$ are the initial number of trifunctional, monofunctional, and bifunctional monomers, respectively.

The highly branched non-crosslinked aerogels of the current invention can be prepared from step-growth polymers. Step-growth polymers are a group of polymeric chemicals that have many uses and beneficial properties. Step-growth polymers can be formed via step-growth polymerization in which bifunctional or multifunctional monomers react to form first dimers, then trimers, then longer oligomers and eventually long chain polymers. Generally, step-growth polymers can have robust mechanical properties including toughness and high temperature resistance that make them desirable over other polymer types. There are numerous varieties of step-growth polymers, including, polyamic amides, polyimides, polyurethanes, polyureas, polyamides, phenolic resins, polycarbonates, and polyesters. In one embodiment the aerogels of the current invention include a polyamic amide polymer. In another embodiment the aerogels of the current invention include a polyamic amide polymer and a polyimide polymer.

The characteristics or properties of the final polymer are significantly impacted by the choice of monomers, which are used to produce the polymer. Factors to be considered when selecting monomers include the properties of the final polymer, such as the flexibility, thermal stability, coefficient of thermal expansion (CTE), coefficient of hydroscopic expansion (CHE) and any other properties specifically desired, as well as cost. Often, certain important properties of a polymer for a particular use can be identified. Other properties of the polymer may be less significant, or may have a wide range of acceptable values; so many different monomer combinations could be used.

D. Aerogel Polymer Compositions

In certain embodiments the aerogel of the current invention includes a polymer or copolymer having repeating units of polyamic amide and polyimide:

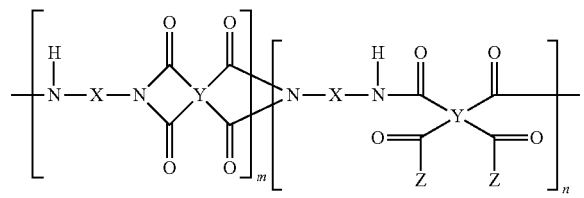

where m and n are the average number of repeat units per chain ranging from 1 to 2000. In one aspect the average number of m can be 1 to 2000, preferably 10 to 1000, and the average number of n can be 1 to 2000, preferably 10 to 1000. In another aspect the ratio of m:n can be 0.001:1 to 1000:1, preferably 0.1:1 to 10:1. The polymers and copolymers can be produced by first preparing a polyamic acid intermediate in situ. The polyamic acid intermediate can then be transformed into a of polyamic amide polymer, a polyimide polymer, or a mixture thereof. In one embodiment, the polyamic acid can be further reacted with a nitrogen containing hydrocarbon to form a polyamic amide polymer. In another embodiment, polyamic acid can be formed into a sheet or a film and subsequently processed with heat (often temperatures higher than 250° C.) or both heat and catalysts to convert the polyamic acid to a polyimide. This process can also be applied after the polyamic acid has been treated with a nitrogen containing hydrocarbon to prepare a mixed polymer containing both polyamic amide monomer and polyimide monomer or copolymer. A copolymer can also be prepared by controlling the amount of amidation versus imidization. One method to control the ratio of m:n includes limiting or providing in excess the nitrogen containing hydrocarbon, such as a secondary amine in the reaction available for amidation. Without being limited to theory, it is believed that controlling the amount, or type of, dehydration agent, temperature, solvent, and/or reaction time can also contribute to the ratio of m:n. Another benefit of an aerogel polymer composition containing polyamic amide polymers is that during the formation of the polyamic amide little to no polyisoimide is formed.

In some instances, the polyamic acid intermediate can be moisture sensitive, and care must be taken to avoid the uptake of water into the polymer solution. Additionally, some polyamic acid intermediates exhibit self-imidization in solution as they gradually convert to the polyimide structure. The imidization reaction can reduce the polymer solubility and produce water as a byproduct. The produced water can then react with the remaining polyamic acid, thereby cleaving the polymer chain, thus polyamic acids are used, in some instances, in situ, or directly after isolation.

In some aspects, the precursors or intermediates that are formed to make the aerogel polymer composition, including polyamic acid, polyamic acid salt precursors, or polyamic amide precursors can be soluble in the reaction solvent. In this instance, the soluble precursor solutions can be cast into a film on a suitable substrate such as by spin casting, gravure coating, three roll coating, knife over roll coating, slot die extrusion, dip coating, Meyer rod coating, or other techniques. The cast film can then be heated in stages to elevated temperatures to remove solvent and convert, for example, the amic acid functional groups in the precursor to polyamic amide through amidation with an appropriate nitrogen containing hydrocarbon, to polyimide by imidization, or by applying appropriate conditions to afford a mixed copolymer.

One class of monomer used to prepare the polymers and copolymers of the current invention can be a diamine, or a diamine monomer. The diamine monomer can also be a diisocyanate, and it is to be understood that an isocyanate could be substituted for an amine in this description, as appropriate. The other type of monomer can be an acid monomer, (e.g., a dianhydride) or a di-acid monomer. Di-acid monomers can include a dianhydride, a tetraester, a diester acid, a tetracarboxylic acid, or a trimethylsilyl ester, all of which can react with a diamine to produce a polyamic acid intermediate that can be used to prepare a polyamic amide polymer or copolymer. Dianhydrides are sometimes referred to in this description, but it is to be understood that tetraesters, diester acids, tetracarboxylic acids, or trimethylsilyl esters could be substituted, as appropriate.

Because one di-acid monomer has two anhydride groups, different diamino monomers can react with each anhydride group so the di-acid monomer can become located between two different diamino monomers. The diamine monomer contains two amine functional groups; therefore, after the first amine functional group attaches to one di-acid monomer, the second amine functional group is still available to attach to another di-acid monomer, which then attaches to another diamine monomer, and so on. In this manner, the polymer backbone is formed. The resulting polycondensation reaction forms a polyamic acid.

The aerogel polymer compositions containing polyamic amide polymer are usually formed from two different types of monomers, and it is possible to mix different varieties of each type of monomer. Therefore, one, two, or more di-acid monomers can be included in the reaction vessel, as well as one, two or more diamino monomers. The total molar quantity of di-acid monomers is kept about the same as the total molar quantity of diamino monomers if a long polymer chain is desired. Because more than one type of diamine or di-acid can be used, the various monomer constituents of each polymer chain can be varied to produce aerogel polymer compositions with different properties. For example, a single diamine monomer AA can be reacted with two di-acid co monomers, $B_1B_1$ and $B_2B_2$, to form a polymer chain of the general form $(AA-B_1B_1)_x-(AA-B_2B_2)_y$, in which x and y are determined by the relative incorporations of $B_1B_1$ and $B_2B_2$ into the polymer backbone. Alternatively, diamine co-monomers $A_1A_1$ and $A_2A_2$ can be reacted with a single di-acid monomer BB to form a polymer chain of the general form of $(A_1A_1-BB)_x-(A_2A_2-BB)_y$. Additionally, two diamine co-monomers $A_1A_1$ and $A_2A_2$ can be reacted with two di-acid co-monomers $B_1B_1$ and $B_2B_2$ to form a polymer chain of the general form $(A_1A_1-B_1B_1)_w-(A_1A_1-B_2B_2)_x-(A_2A_2-B_1B_1)_y-(A_2A_2-B_2B_2)_z$, where w, x, y, and z are determined by the relative incorporation of $A_1A_1-B_1B_1$, $A_1A_1-B_2B_2$, $A_2A_2-B_1B_1$, and $A_2A_2-B_2B_2$ into the polymer backbone. More than two di-acid co-monomers and/or more than two diamine co-monomers can also be used. Therefore, one or more diamine monomers can be polymerized with one or more di-acids, and the general form of the polymer is determined by varying the amount and types of monomers used.

There are many examples of monomers that can be used to make the aerogel polymer compositions containing polyamic amide polymer of the present invention. In some embodiments, the diamine monomer is a substituted or unsubstituted aromatic diamine, a substituted or unsubstituted alkyldiamine, or a diamine that can include both aromatic and alkyl functional groups. A non-limiting list of possible diamine monomers include 4,4'-oxydianiline, 3,4'-oxydianiline, 3,3'-oxydianiline, p-phenylenediamine, m-phenylenediamine, o-phenylenediamine, diaminobenzanilide, 3,5-diaminobenzoic acid, 3,3'-diaminodiphenylsulfone, 4,4'-diaminodiphenylsulfones, 1,3-bis-(4-aminophenoxy)benzene, 1,3-bis-(3-aminophenoxy)benzene, 1,4-bis-(4-aminophenoxy)benzene, 1,4-bis-(3-aminophenoxy)benzene, 2,2-Bis[4-(4-aminophenoxy)phenyl]-hexafluoropropane, 2,2-bis(3-aminophenyl)-1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis-[4-(4-aminophenoxy)phenyl]sulfones, 2,2-bis[4-(3-aminophenoxy)phenyl]sulfones, bis(4-[4-aminophenoxy]phenyl)ether, 2,2'-bis-(4-aminophenyl)-hexafluoropropane, (6F-diamine), 2,2'-bis-(4-phenoxyaniline)isopropylidene, meta-phenylenediamine, para-phenylenediamine, 1,2-diaminobenzene, 4,4'-diaminodiphenylmethane, 2,2-bis(4-aminophenyl)propane, 4,4'diaminodiphenylpropane, 4,4'-diaminodiphenylsulfide, 4,4'-diaminodiphenylsulfone, 3,4'diaminodiphenylether, 4,4'-diaminodiphenylether, 2,6-diaminopyridine, bis(3-aminophenyl)diethyl silane, 4,4'-diaminodiphenyl diethyl silane, benzidine, dichlorobenzidine, 3,3'-dimethoxybenzidine, 4,4'-diaminobenzophenone, N,N-bis(4-aminophenyl)-n-butylamine, N,N-bis(4-aminophenyl) methylamine, 1,5-diaminonaphthalene, 3,3'-dimethyl-4,4'-diaminobiphenyl, 4-aminophenyl-3-aminobenzoate, N,N-bis(4-aminophenyl)aniline, bis(p-beta-amino-t-butylphenyl) ether, p-bis-2-(2-methyl-4-aminopentyl)benzene, p-bis(1,1-dimethyl-5-aminopentyl)benzene, 1,3-bis(4-aminophenoxy) benzene, m-xylenediamine, p-xylenediamine, 4,4'-diaminodiphenyletherphosphine oxide, 4,4'-diaminodiphenyl N-methylamine, 4,4'-diaminodiphenyl N-phenylamine, amino-terminal polydimethylsiloxanes, amino-terminal polypropyleneoxides, amino-terminal polybutyleneoxides, 4,4'-methylenebis(2-methylcyclohexylamine), 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-methylenebisbenzeneamine, 2,2'-dimethylbenzidine, (also known as 4,4'-diamino-2,2'-dimethylbiphenyl (DMB), bisaniline-p-xylidene, 4,4'-bis(4-aminophenoxy)biphenyl, 3,3'-bis(4 aminophenoxy) biphenyl, 4,4'-(1,4-phenylenediisopropylidene)bisaniline, and 4,4'-(1,3-phenylenediisopropylidene)bisaniline, or combinations thereof. In a specified embodiment, the diamine monomer is 4,4'-oxydianiline, 2,2'-dimethylbenzidine, or both.

A non-limiting list of possible dianhydride monomers include hydroquinone dianhydride, 3,3,4,4'-biphenyltetracarboxylic dianhydride (BPDA), pyromellitic dianhydride, 3,3',4,4'-benzophenonetetracarboxylic dianhydride, 4,4'-oxydiphthalic anhydride, 3,3',4,4'-diphenylsulfonetetracarboxylic dianhydride, 4,4'-(4,4'-isopropylidenediphenoxy)bis (phthalic anhydride), 2,2-bis(3,4-dicarboxyphenyl)propane dianhydride, 4,4'-(hexafluoroisopropylidene)diphthalic anhydride, bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetraearboxylic dianhydride, 3,3',4,4'-benzophenonetetraearboxylic dianhydride, naphthalene-2,3,6,7-tetracarboxylic dianhydride, naphthalene-1,4,5,8-tetracarboxylie dianhydride, 4,4'-oxydiphthalic dianhydride, 3,3',4,4'-biphenylsulfonetetracarboxylic dianhydride, 3,4,9,10-perylene tetracarboxylic dianhydride, bis(3,4-dicarboxyphenyl)sulfide dianhydride, bis(3,4-dicarboxyphenyl)methane dianhydride, 2,2-bis(3,4-dicarboxyphenyl)propane dianhydride, 2,2-bis(3,4-dicarboxyphenyl)hexafluoropropane, 2,6-dichloronaphthalene-1, 4,5,8-tetracarboxylic dianhydride, 2,7-dichloronapthalene-1,4,5,8-tetracarboxylic dianhydride, 2,3,6,7-tetrachloronaphthalene-1,4,5,8-tetracarboxylic dianhydride, phenanthrene-, 8,9,10-tetracarboxylie dianhydride, pyrazine-2,3,5,6-tetracarboxylic dianhydride, benzene-1,2,3,4-tetracarboxylic dianhydride, and thiophene-2,3,4,5-tetracarboxylic dianhydride, or combinations thereof. In a specific embodiment, the dianhydride monomer is 3,3',4,4'-biphenyltetracarboxylic dianhydride, pyromellitic dianhydride, or both.

In some aspects, the molar ratio of anhydride to total diamine is from 0.4:1 to 1.6:1, 0.5:1 to 1.5:1, 0.6:1 to 1.4:1, 0.7:1 to 1.3:1, or specifically from 0.8:1 to 1.2:1. In further aspects, the molar ratio of dianhydride to multifunctional amine (e.g., triamine) is 2:1 to 140:1, 3:1 to 130:1, 4:1 to 120:1, 5:1 to 110:1, 6:1 to 100:1, 7:1 to 90:1, or specifically from 8:1 to 80:1. The polymer can also include a monoanhydride group, including for example 4-amino-1,8-naphthalic anhydride, endo-bicyclo[2.2.2]oct-5-ene-2,3-dicarboxylic anhydride, citraconic anhydride, trans-1,2-cyclohexanedicarboxylic anhydride, 3,6-dichlorophthalic anhydride, 4,5-dichlorophthalic anhydride, tetrachlorophthalic anhydride 3,6-difluorophthalic anhydride, 4,5-difluorophthalic anhydride, tetrafluorophthalic anhydride, maleic anhydride, 1-cyclopentene-1,2-dicarboxylic anhydride, 2,2-dimethylglutaric anhydride 3,3-dimethylglutaric anhydride, 2,3-dimethylmaleic anhydride, 2,2-dimethylsuccinic anhydride, 2,3-diphenylmaleic anhydride, phthalic anhydride, 3-methylglutaric anhydride, methylsuccinic anhydride, 3-nitrophthalic anhydride, 4-nitrophthalic anhydride, 2,3-pyrazinedicarboxylic anhydride, or 3,4-pyridinedicarboxylic anhydride. Specifically, the mono-anhydride group is phthalic anhydride.

In another embodiment, the polymer compositions used to prepare the aerogels of the present invention include multifunctional amine monomers with at least three primary amine functionalities. The multifunctional amine may be a substituted or unsubstituted aliphatic multifunctional amine, a substituted or unsubstituted aromatic multifunctional amine, or a multifunctional amine that includes a combination of an aliphatic and two aromatic groups, or a combination of an aromatic and two aliphatic groups. A non-limiting list of possible multifunctional amines include propane-1,2,3-triamine, 2-aminomethylpropane-1,3-diamine, 3-(2-aminoethyl)pentane-1,5-diamine, bis(hexamethylene)triamine, N,N'-bis(2-aminoethyl)ethane-1,2-diamine, N,N'-bis(3-aminopropyl)propane-1,3-diamine, 4-(3-aminopropyl)heptane-1,7-diamine, N,N'-bis(6-aminohexyl)hexane-1,6-diamine, benzene-1,3,5-triamine, cyclohexane-1,3,5-triamine, melamine, N-2-dimethyl-1,2,3-propanetriamine, diethylenetriamine, 1-methyl or 1-ethyl or 1-propyl or 1-benzyl-substituted diethylenetriamine, 1,2-dibenzyldiethylenetriamine, lauryldiethylenetriamine, N-(2-hydroxypropyl)diethylenetriamine, N,N-bis(1-methylheptyl)-N-2-dimethyl-1,2,3-propanetriamine, 2,4,6-tris(4-(4-aminophenoxy)phenyl)pyridine, N,N-dibutyl-N-2-dimethyl-1,2,3-propanetriamine, 4,4'-(2-(4-aminobenzyl)propane-1,3-diyl)dianiline, 4-((bis(4-aminobenzyl)amino)methyl)aniline, 4-(2-(bis(4-aminophenethyl)amino)ethyl)aniline, 4,4'-(3-(4-aminophenethyl)pentane-1,5-diyl)dianiline, 1,3,5-tris(4-aminophenoxy)benzene (TAPOB), 4,4',4''-methanetriyltrianiline, N,N,N',N'-Tetrakis(4-aminophenyl)-1,4-phenylenediamine, a polyoxypropylenetriamine, octa(aminophenyl)polyhedral oligomeric silsesquioxane, or combinations thereof. A specific example of a polyoxypropylenetriamine is JEFFAMINE® T-403 from Huntsman Corporation, The Woodlands, Tex. USA. In a specific embodiment, the aromatic multifunctional amine may be 1,3,5-tris(4-aminophenoxy)benzene or 4,4',4''-methanetriyltrianiline. In some embodiments, the multifunctional amine includes three primary amine groups and one or more secondary and/or tertiary amine groups, for example, N',N'-bis(4-aminophenyl)benzene-1,4-diamine.

Non-limiting examples of capping agents or groups include amines, maleimides, nadimides, acetylene, biphenylenes, norbornenes, cycloalkyls, and N-propargyl and specifically those derived from reagents including 5-norbornene-2,3-dicarboxylic anhydride (nadic anhydride, NA), methyl-nadic anhydride, hexachloro-nadic anhydride, cis-4-cyclohexene-1,2-dicarboxylic anhydride, 4-amino-N-propargylphthalimide, 4-ethynylphthalic anhydride, and maleic anhydride.

In some instances, the backbone of the aerogel polymer compositions can include further substituents. The substituents (e.g., oligomers, functional groups, etc.) can be directly bonded to the backbone or linked to the backbone through a linking group (e.g., a tether or a flexible tether). In other embodiments, a compound or particles can be incorporated (e.g., blended and/or encapsulated) into the polymer structure without being covalently bound to the polymer structure. In some instances, the incorporation of the compound or particles can be performed during the any step of the reaction process. In some instances, particles can aggregate, thereby producing polyamic amide or polyimide having domains with different concentrations of the non-covalently bound compounds or particles.

In one instance, an aerogels of the present invention can include at least 5 wt. % of the polyamic amide polymer based on the total weight of the polymer aerogel. In one particular instance, an aerogel of the present invention can include 5 wt. % to 50 wt. % of the polyamic amide polymer based on the total weight of the polymer aerogel. In another instance, an aerogel of the present invention can include 5 wt. % to 25 wt. % of the polyamic amide polymer based on the total weight of the polymer aerogel. An aerogel of the present invention can include 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt. % of the polyamic amide polymer based on the total weight of the polymer aerogel.

E. Preparation of Aerogels

Aerogels of the present disclosure can be made using a multi-step process that includes 1) preparation of the polyamic amide gel, 2) solvent exchange, and 3) drying of the polymeric solution to form the aerogel. These process steps are discussed in more detail below.

Figure 2:
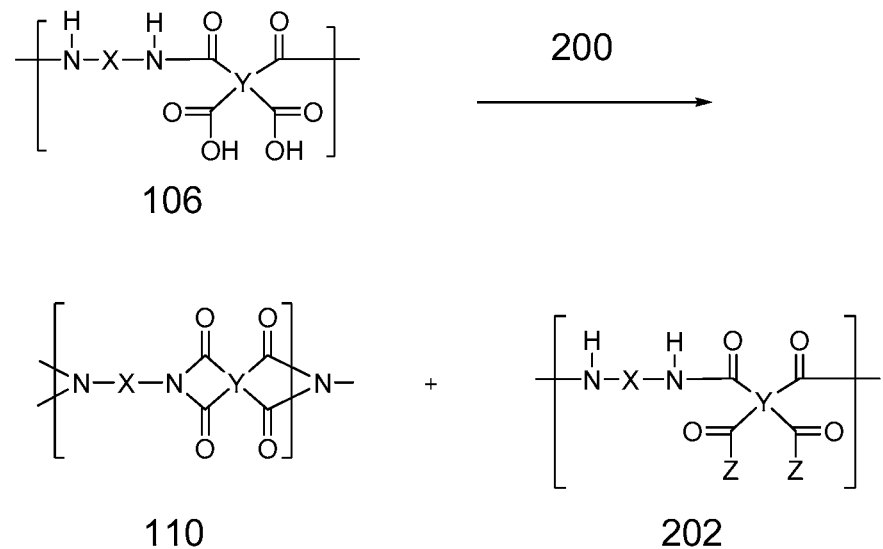
FIG. 2 is a reaction schematic of an embodiment showing the synthesis of a polyimide polymer including polyamic amide.

FIG. 1 is a non-limiting reaction schematic showing a conventional synthesis of a polyimide polymer that generate a polyisoimide byproduct. Diamine 100 is mixed with dianhydride 102 under reaction conditions 104 to form an polyamic acid intermediate 106 that is further treated with a tertiary amine and dehydration agent under reaction conditions 108 to form polyimide 110 and polyisoimide 112. In contrast to the conventional synthesis, the method of the present invention produces a copolymer having a polyimide repeating unit and a polyamic amide repeating unit. FIG. 2 is a non-limiting reaction schematic showing in another embodiment the synthesis of a polyimide polymer including polyamic amide instead of polyisoimide. Polyamic acid intermediate 106 can be treated with a nitrogen containing hydrocarbon containing a secondary and tertiary amine and a dehydration agent under reaction conditions 200 to form polyimide 110 and polyamic amide 202.

1. Polyamic Amide Gels

The method to prepare a polyamic amide can include (a) providing at least one diamine compound to a solvent to form a solution; (b) providing at least one dianhydride compound to the solution of step (a) under conditions sufficient to form a polyamic acid solution; (c) providing a secondary amine to the polyamic acid solution; (d) subjecting the mixture of step (c) to conditions suitable to produce a polymer matrix solution including a polyamic amide; and (e) subjecting the polymer matrix solution to conditions sufficient to form an aerogel. As discussed above, numerous acid monomers, diamino monomers, and multifunctional amine monomers can be used to synthesize a polyamic amide having minimal or no cross-linking. In one aspect of the current invention, one or more diamino monomers and one or more multifunctional amine monomers are premixed in one or more solvents and then treated with one or more dianhydrides (e.g., di-acid monomers) that are added in sequentially smaller amounts at pre-defined time increments while monitoring the viscosity. The desired viscosity of the polymerized solution can range from 50 to 20,000 cP or specifically 500 to 5,000 cP. By performing the reaction using incremental addition of dianhydride while monitoring viscosity, a non-crosslinked aerogel can be prepared. For instance, a triamine monomer (23 equiv.) can be added to the solvent to give a 0.0081 molar solution. To the solution a first diamine monomer (280 equiv.) can be added, followed by second diamine monomer (280 equiv.). Next a dianhydride (552 total equiv.) can be added in sequentially smaller amounts at pre-defined time increments while monitoring the viscosity. The dianhydride can be added until the viscosity reaches 1,000 to 1,500 cP. For example, a first portion of dianhydride can be added, the reaction can be stirred (e.g., for 20 minutes), a second portion of dianhydride can be added, and a sample of the reaction mixture was then analyzed for viscosity. After stirring for additional time (e.g., for 20 minutes), a third portion of dianhydride can be added, and a sample can be taken for analysis of viscosity. After further stirring for a desired period of time (e.g., 10 hours to 12 hours), a mono-anhydride (96 equiv.) can be added. After having reached the target viscosity, the reaction mixture can be stirred for a desired period of time (e.g., 10 hours to 12 hours) or the reaction is deemed completed. After a desired amount of time (e.g., about 2 hours), the product can be isolated (e.g., filtered), after which a nitrogen containing hydrocarbon (828 equiv.) and dehydration agent (1214 equiv.) can be added.

The reaction solvent can be dimethylsulfoxide, diethylsulfoxide, N,N-dimethylformamide, N,N-diethylformamide, N,N-dimethylacetamide, N,N-diethylacetamide, N-methyl-2-pyrrolidone, 1-methyl-2-pyrrolidinone, N-cyclohexyl-2-pyrrolidone, 1,13-dimethyl-2-imidazolidinone, diethyleneglycoldimethoxyether, o-dichlorobenzene, phenols, cresols, xylenol, catechol, butyrolactones, hexamethylphosphoramide, or mixtures thereof. The reaction solvent and other reactants can be selected based on the compatibility with the materials and methods applied i.e. if the polymerized polyamic amide gel is to be cast onto a support film, injected into a moldable part, or poured into a shape for further processing into a workpiece. In a specific embodiment, the reaction solvent is dimethylsulfoxide.

In some aspects, a chemical curing system suitable for driving the conversion of polymer precursor to the polyamic amide or polyimide state can be employed. Chemical catalysts can include nitrogen containing hydrocarbons. Non-limiting examples of such compounds include compounds containing at least one secondary amine. In one particular instance, an organic compound having a secondary and a tertiary amine, such as 2-methyl imidazole or 2-ethyl-4-methylimidazole can be used as a chemical catalyst. In some embodiments, the secondary amines can be used in combination with other chemical catalysts such as pyridine, methylpyridines, quinoline, isoquinoline, 1,8-diazabicyclo[5.4.0]undec-7-ene (DBU), DBU phenol salts, carboxylic acid salts of DBU, triethylenediamine, carboxylic acid slats of triethylenediamine, lutidine, N-methylmorpholine, triethylamine, tripropylamine, tributylamine, other trialkylamines, or combinations thereof. Any dehydrating agent suitable for amidation can be used in the methods of the present invention. Dehydrating agents may include acetic anhydride, propionic anhydride, n-butyric anhydride, benzoic anhydride, trifluoroacetic anhydride, oxalyl chloride, thionyl chloride, phosphorus trichloride, dicyclohexylcarbodiimide, 1,1'-carbonyldiimidazole (CDI), di-tert-butyl dicarbonate ($Boc_2O$), or combinations thereof. Amidation can also be achieved by using standard peptide coupling reagents such as benzotriazol-1-yl-oxytripyrrolidinophosphonium hexafluorophosphate (PyBOP) or 1-[Bis(dimethylamino)methylene]-1H-1,2,3-triazolo[4,5-b]pyridinium 3-oxid hexafluorophosphate (HATU) in the presence of a base such as N,N-diisopropylethylamine (DIPEA), and a solvent, such as DMF and the like.

While keeping the above in mind, the introduction of macropores into the aerogel polymeric matrix, as well as modifying or tuning the amount of such macropores present, can be performed in the manner described above in the Summary of the Invention Section as well as throughout this specification. In one non-limiting manner, the formation of macropores vs smaller mesopores and micropores can be primarily controlled by controlling the polymer/solvent dynamics during gel formation. By doing so, the pore structure can be controlled, and the quantity and volume of macroporous, mesoporous, microporous cells can be controlled. For example, a curing additive that reduces the resultant polyimide solubility, such as 1,4-diazabicyclo[2.2.2]octane, produces a polyimide containing a higher number of macropores compared to another curing additive that improves the resultant polymer solubility, such as trimethylamine. In another example, using the same dianhydride such as BPDA but increasing the ratio of rigid amines incorporated into the polymer backbone such as p-PDA as compared to more flexible diamines such as 4,4'-ODA, the formation of macropores as compared to smaller mesopores and micropores can be controlled.

In some embodiments, the polyamic amide solution can be cast onto a casting sheet covered by a support film for a period of time. In certain embodiments, the casting sheet is a polyethylene terephthalate (PET) casting sheet. After a passage of time, the polymerized gel can be removed from the casting sheet and prepared for the solvent exchange process.

2. Solvent Exchange

After the polyamic amide gel is synthesized, it can be subjected to a solvent exchange where the reaction solvent is exchanged for a more desirable second solvent. The original solvent can be exchanged with a second solvent having a higher volatility than the first solvent and repeated with various solvents. By way of example, the polymerized gel can be placed inside of a pressure vessel and submerged in a mixture that includes the reaction solvent and the second solvent. Then, a high pressure atmosphere can be created inside of the pressure vessel thereby forcing the second solvent into the polymerized gel and displacing a portion of the reaction solvent. Alternatively, the solvent exchange step can be conducted without the use of a high pressure environment. It may be necessary to conduct a plurality of rounds of solvent exchange.

The time necessary to conduct the solvent exchange can vary depending upon the type of polymer undergoing the exchange as well as the reaction solvent and second solvent being used. In one embodiment, each solvent exchange can range from 1 to 168 hours or any period time there between including 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, or 167 hours. In another embodiment, each solvent exchange can take approximately 30 minutes. Exemplary second solvents include methanol, ethanol, 1-propanol, 2-propanol, 1-butanol, 2-butanol, isobutanol, tert-butanol, 3-methyl-2-butanol, 3,3-dimethyl-2-butanol, 2-pentanol, 3-pentanol, 2,2-dimethylpropan-1-ol, cyclohexanol, diethylene glycol, cyclohexanone, acetone, acetyl acetone, 1,4-dioxane, diethyl ether, dichloromethane, trichloroethylene, chloroform, carbon tetrachloride, water, and mixtures thereof. In a specific embodiment, the second solvent is acetone. In certain non-limiting embodiments, the second solvent can have a suitable freezing point for performing supercritical or subcritical drying steps. For example tert-butyl alcohol has a freezing point of 25.5° C. and water has a freezing point of 0° C. under one atmosphere of pressure. Alternatively, and as discussed below, however, the drying can be performed without the use of supercritical or subcritical drying steps, such as by evaporative drying techniques.

The temperature and pressure used in the solvent exchange process can be varied. The duration of the solvent exchange process can be adjusted by performing the solvent exchange at a varying temperatures or atmospheric pressures, or both, provided that the pressure and temperature inside the pressure vessel does not cause either the first solvent or the second solvent to leave the liquid phase and become gaseous phase, vapor phase, solid phase, or supercritical fluid. Generally, higher pressures and/or temperatures decrease the amount of time required to perform the solvent exchange, and lower temperatures and/or pressures increase the amount of time required to perform the solvent exchange.

3. Cooling and Drying

In some embodiments after solvent exchange, the polymerized gel can be dried. The drying step can include supercritical drying, subcritical drying, thermal drying, evaporative air-drying, or any combination thereof. In some embodiments, the polymerized gel can be exposed to supercritical drying. In this instance the solvent in the gel can be removed by supercritical $CO_2$ extraction.

In another embodiment after solvent exchange, the polymerized gel can be exposed to subcritical drying. In this instance, the gel can be cooled below the freezing point of the second solvent and subjected to a freeze drying or lyophilization process to produce the aerogel. For example, if the second solvent is water, then the polymerized gel is cooled to below 0° C. After cooling, the polymerized gel is subjected to a vacuum for a period of time wherein the second solvent is allowed to sublime.

In still another embodiment after solvent exchange, the polymerized gel can be exposed to subcritical drying with optional heating after the majority of the second solvent has been removed through sublimation. In this instance, the partially dried gel material is heated to a temperature near, or above, the boiling point of the second solvent for a period of time. The period of time can range from a few hours to several days, although a typical period of time is approximately 4 hours. During the sublimation process, a portion of the second solvent present in the polymerized gel has been removed, leaving a gel that can have macropores, mesopores, or micropores, or any combination thereof or all of such pore sizes. After the sublimation process is complete, or nearly complete, the aerogel has been formed.

In yet another embodiment after solvent exchange, the polymerized gel can be dried under ambient conditions, for example, by removing the solvent under a stream of gas (e.g., air, anhydrous gas, inert gas (e.g., nitrogen ($N_2$) gas), etc. Still further, passive drying techniques can be used such as simply exposing the gel to ambient conditions without the use of a gaseous stream. In this instance, the solvent in the gel is removed by evaporation and pore collapse is prevented by the aerogel network. The drying may also be assisted by heating or irradiating with electromagnetic radiation.

F. Articles of Manufacture

The open-cell aerogel of the present invention can be included in an article of manufacture. For example, an article of manufacture can include a branched polyamic amide matrix with less than 5% by weight of crosslinked polymers. In some embodiments, the article of manufacture is a thin film, monolith, wafer, blanket, core composite material, substrate for radiofrequency antenna, a sunscreen, a sunshield, a radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus.

1. Fluid Filtration Applications

In some embodiments, the open-cell aerogel of the present invention can be used in fluid filtration systems and apparatus. A feed fluid can be contacted with the branched polyamic amide aerogel such that some, all or, substantially all, of the impurities and/or desired substances are removed from the feed fluid to produce a filtrate essentially devoid of the impurities and/or desired substances. The filtrate, impurities, and/or desired substances can be collected, stored, transported, recycled, or further processed. The polyamic amide aerogel can be further processed to release the impurities and/or desired substances from the aerogel.

The polyamic amide aerogel described herein can be used in or with filtration apparatuses known in the art. Non-limiting examples of filtration apparatuses and applications include gas filters such as, but not limited to, building air filters, automotive cabin air filters, combustion engine air filters, aircraft air filters, satellite air filters, face mask filters, diesel particulate filters, in-line gas filters, cylinder gas filters, soot filters, pressure swing absorption apparatus, etc. Additional non-limiting examples of filtration apparatuses and applications include solvent filtration systems, column filtration, chromatography filtration, vacuum flask filtration, microfiltration, ultrafiltration, reverse osmosis filtration, nanofiltration, centrifugal filtration, gravity filtration, cross flow filtration, dialysis, hemofiltration, hydraulic oil filtration, automotive oil filtration, etc. Further, non-limiting examples of the purpose of filtration includes sterilization, separation, purification, isolation, etc.

A fluid for filtration ("feed") and a filtrate can be any fluid. The fluid can be a liquid, gas, supercritical fluid, emulsion, or mixture thereof. In some instances, the liquid can be aqueous, non-aqueous, organic, non-organic, biological in origin, or a mixture thereof. In some instances, the gas can include air, nitrogen, oxygen, an inert gas, or mixtures thereof. In some instances, the liquid can contain solids and/or other fluids or be an emulsion. In particular instances the emulsion is a water-oil emulsion, an oil-water emulsion, a water-solvent emulsion, a solvent-water emulsion, an oil-solvent emulsion, or a solvent-oil emulsion. As non-limiting examples, the liquid can be water, blood, plasma, an oil, a solvent, air, or mixtures thereof. The solvent can be an organic solvent. Water can include water, any form of steam and supercritical water.

In some instances, the fluid can contain impurities. Non-limiting examples of impurities include solids, liquids, gases, supercritical fluids, objects, compounds, and/or chemicals, etc. What is defined as an impurity may be different for the same feed fluid depending on the filtrate desired. In some embodiments, one or more aerogels can be used to remove impurities. Non-limiting examples of impurities in water can include ionic substances such as sodium, potassium, magnesium, calcium, fluoride, chloride, bromide, sulfate, sulfite, nitrate, nitrites, cationic surfactants, and anionic surfactants, metals, heavy metals, suspended, partially dissolved, or dissolved oils, organic solvents, non-ionic surfactants, defoamants, chelating agents, microorganisms, particulate matter, etc. Non-limiting examples of impurities in blood can include red blood cells, white blood cells, antibodies, microorganisms, water, urea, potassium, phosphorus, gases, particulate matter, etc. Non-limiting examples of impurities in oil can include water, particulate matter, heavy and/or light weight hydrocarbons, metals, sulfur, defoamants, etc. Non-limiting examples of impurities in solvents can include water, particulate matter, metals, gases, etc. Non-limiting impurities in air can include water, particulate matter, microorganisms, liquids, carbon monoxide, sulfur dioxide, etc.

In some instances, the feed fluid can contain desired substances. Desired substances can be, but are not limited to, solids, liquids, gases, supercritical fluids, objects, compounds, and/or chemicals, etc. In some embodiments, one or more aerogels can be used to concentrate or capture a desired substance, or remove a fluid from a desired substance. Non-limiting examples of desired substances in water can include ionic substances such as sodium, potassium, magnesium, calcium, fluoride, chloride, bromide, sulfate, sulfite, nitrate, nitrites, cationic surfactants, and anionic surfactants, metals, heavy metals, suspended, partially dissolved, or dissolved oils, organic solvents, nonionic surfactants, chelating agents, microorganisms, particulate matter, etc. Non-limiting examples of desired substances in blood can include red blood cells, white blood cells, antibodies, lipids, proteins, etc. Non-limiting examples of desired substances in oil can include hydrocarbons of a range of molecular weights, gases, metals, defoamants, etc. Non-limiting examples of desired substances in solvents can include particulate matter, fluids, gases, proteins, lipids, etc. Non-limiting examples of desired substances in air can include water, fluids, gases, particulate matter, etc.

Figure 3:
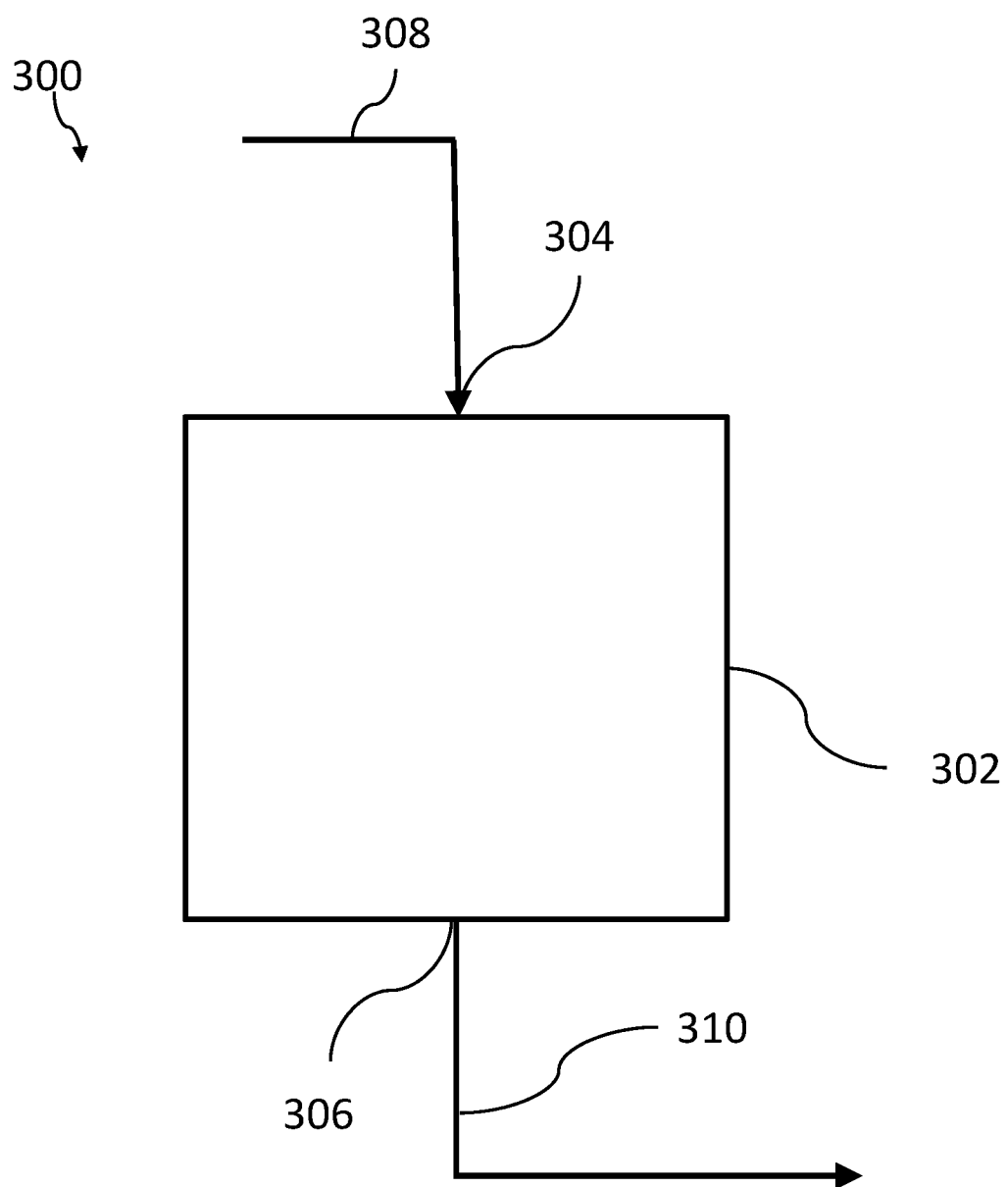
FIG. 3 is a schematic of system of an embodiment for filtering a fluid using a polyamic amide aerogel, the system having a separation zone, an inlet, and an outlet.
Figure 4:
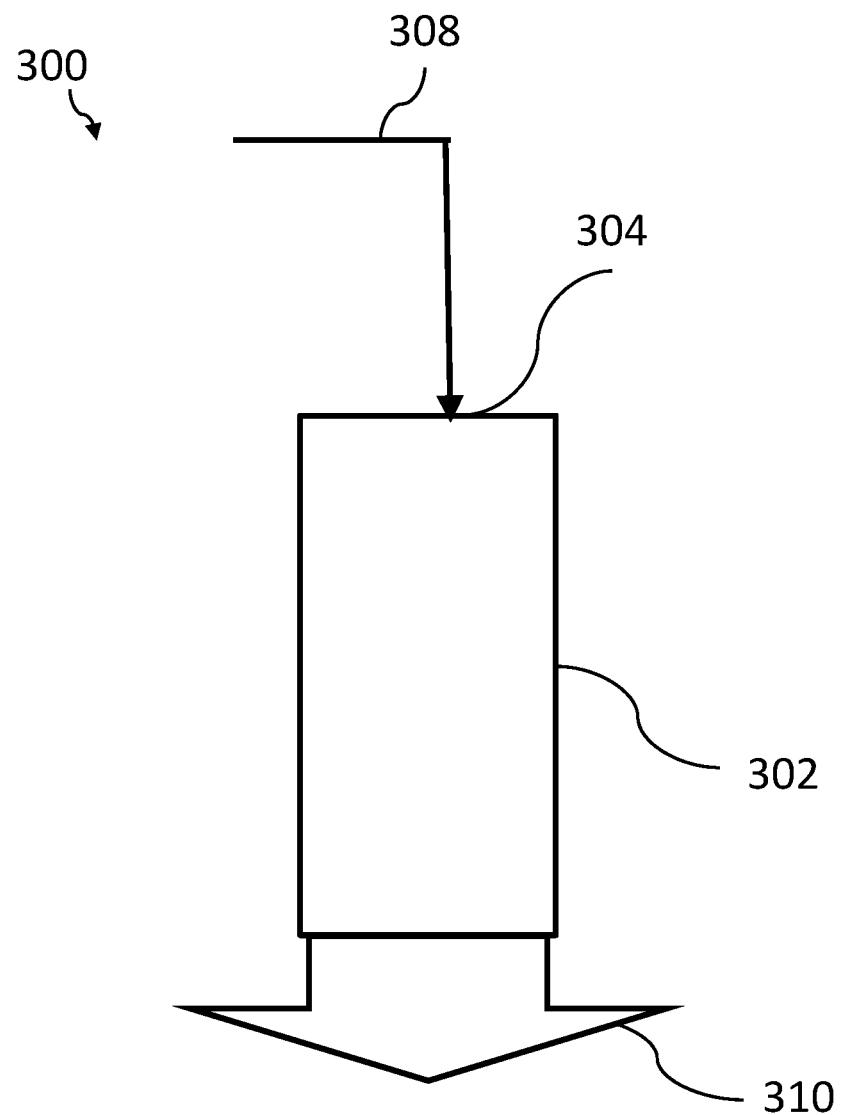
FIG. 4 is a schematic of system of an embodiment for filtering a fluid using a polyamic amide aerogel, the system having a separation zone and an inlet.
Figure 5:
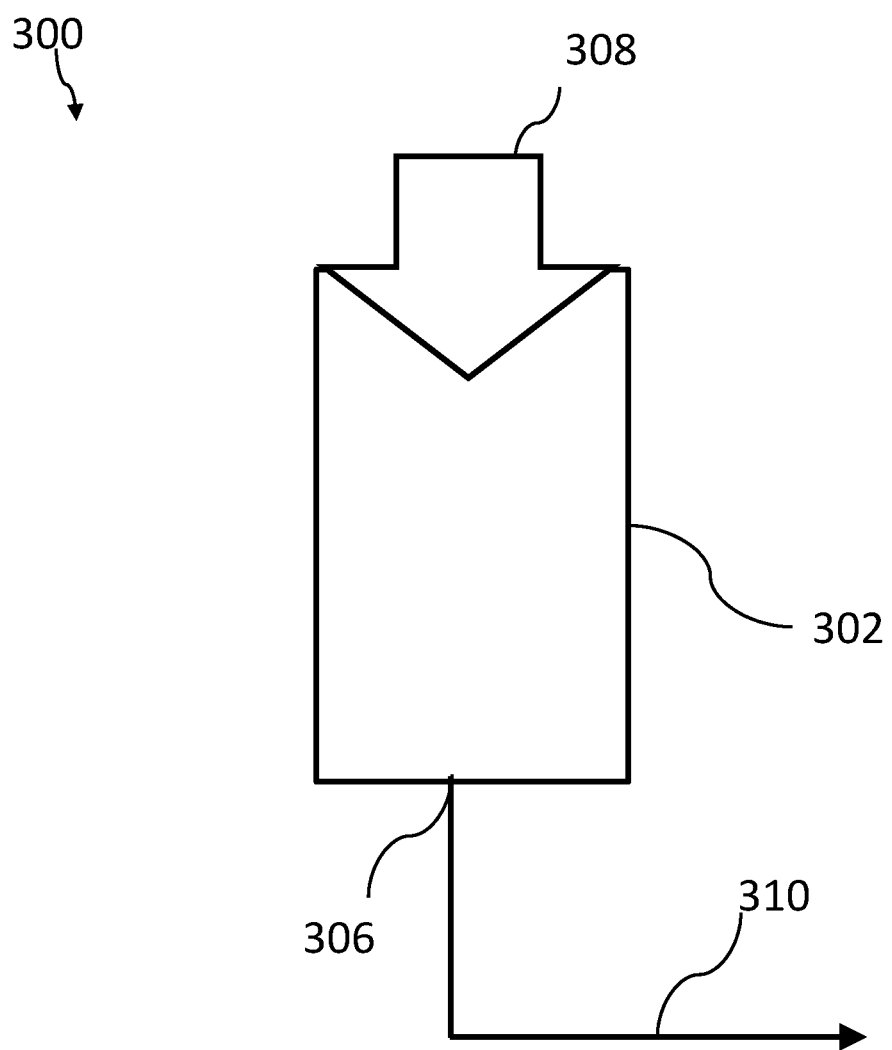
FIG. 5 is a schematic of system of an embodiment for filtering a fluid using a polyamic amide aerogel, the system having a separation zone and an outlet.

FIGS. 3, 4, and 5 are non-limiting schematics of a system 300 used to carry out a filtration of a fluid using an aerogel. System 300 can include a separation zone 302. The materials, size, and shape of the separation zone 302 can be determined using standard engineering practice to achieve the desired flow rates and contact time. The separation zone 302 is capable of holding or may be made of one or more aerogels and includes a feed fluid inlet 304 (inlet) and/or a filtrate outlet 306 (outlet). In some instances, the separation zone is made entirely of one or more branched polyamic amide aerogels or one or more branched polyamic amide aerogels in or around a supporting structure. The feed fluid 308 can be introduced to the separation zone 302 through the inlet 304 (See, FIGS. 3 and 4) or through direct contact with the separation zone 302 (FIG. 5). In some embodiments, the feed fluid 308 can be received under greater or reduced pressure than ambient pressure. Introduction of the feed fluid 308 into separation zone 302 can be at a rate sufficient to allow optimum contact of the feed fluid with the one or more aerogels. Contact of the feed fluid 308 with the aerogel can allow the feed fluid to be filtered by the aerogel, which results in the filtrate 310. The filtrate 310 can have less impurity and/or desired substance when compared with the feed fluid 308. In certain aspects, the filtrate 310 can be essentially free of the impurity and/or the desired substance. The filtrate 310 can exit the separation zone 302 via the outlet 306 (See, FIGS. 3 and 5) or through directly exiting the separation zone 302 (See, FIG. 4). In some instances, the filtrate can be recycled back to a separation zone, collected, stored in a storage unit, etc. In some instances, one or more aerogels can be removed and/or replaced from the separation zone. In some instances, the filtrate 310 can be collected and/or removed from the separation zone 302 without the filtrate 310 flowing through an outlet 306. In some instances, the impurities and/or desired substance can be removed from the separation zone 302. As one non-limiting example, removal of the impurities and/or desired substances from the separation zone using counter-current flow of the fluids through the separation zone.

The filtration conditions in the separation zone 302 can be varied to achieve a desired result (e.g., removal of substantially all of the impurities and/or desired substance from the feed fluid). The filtration conditions include temperature, pressure, fluid feed flow, filtrate flow, or any combination thereof. Filtration conditions are controlled, in some instances, to produce streams with specific properties. The separation zone 302 can also include valves, thermocouples, controllers (automated or manual controllers), computers or any other equipment deemed necessary to control or operate the separation zone. The flow of the feed fluid 304 can be adjusted and controlled to maintain optimum contact of the feed fluid with the one or more aerogel. In some embodiments, computer simulations can be used to determine flow rates for separation zones of various dimensions and various aerogels.

The compatibility of an aerogel with a fluid and/or filtration application can be determined by methods known in the art. Some properties of an aerogel that may be determined to assess the compatibility of the aerogel may include, but is not limited to: the temperature and/or pressures that the aerogel melts, dissolves, oxidizes, reacts, degrades, or breaks; the solubility of the aerogel in the material that will contact the aerogel; the flow rate of the fluid through the aerogel; the retention rate of the impurity and/or desired product form the feed fluid; etc.

2. Radiofrequency (RF) Applications

Due to their low density, mechanical robustness, light weight, and low dielectric properties, the branched polyamic amide aerogels can be used in radiofrequency (RF) applications. The use of branched polyamic amide aerogels in RF applications enables the design of thinner substrates, lighter weight substrates and smaller substrates. Non-limiting examples of radiofrequency applications include a substrate for a RF antenna, a sunshield for a RF antenna, a radome, or the like. Antennas can include flexible and/or rigid antennas, broadband planar circuited antennas (e.g. a patch antennas, an e-shaped wideband patch antenna, an elliptically polarized circular patch antenna, a monopole antenna, a planar antenna with circular slots, a bow-tie antenna, an inverted-F antenna and the like). In the antenna design, the circuitry can be attached to a substrate that includes the branched polyamic amide aerogel and/or a mixture of the branched polyamic amide aerogel and other components such as other polymeric materials including adhesives or polymer films, organic and inorganic fibers (e.g. polyester, polyamide, polyimide, carbon, glass fibers), other organic and inorganic materials including silica aerogels, polymer powder, glass reinforcement, etc. The use of branched polyamic amide aerogels in antennas enables the design substrates with higher throughput. In addition, the branched polyamic amide aerogels have coefficient of linear thermal expansion (CTE) similar to aluminum and copper (e.g., CTE of 23 ppm/K and 17 ppm/K), and is tunable through choice of monomer to match CTE of other desirable materials. In some embodiments, the aerogel can be used in sunshields and/or sunscreens used to protect RF antennas from thermal cycles due to their temperature insensitivity and RF transparency. In certain embodiments, the aerogel can be used as a material in a radome application. A radome is a structural, weatherproof enclosure that protects a microwave (e.g., radar) antenna. Branched polyamic amide aerogels can minimize signal loss due to their low dielectric constant and also provide structural integrity due to their stiffness.

EXAMPLES

The present invention will be described in greater detail by way of specific examples. The following examples are offered for illustrative purposes only, and are not intended to limit the invention in any manner.

Example 1

Preparation of a Highly Branched Polyamic Amide

A reaction vessel with a mechanical stirrer and a water jacket was employed. The flow of the water through the reaction vessel jacket was adjusted to maintain temperature in the range of 20-28° C. The reaction vessel was charged with dimethylsulfoxide (DMSO) (108.2 lbs. 49.1 kg), and the mechanical stirrer speed was adjusted to 120-135 rpm. 1,3,5-tris(4-aminophenoxy) benzene (TAPOB, 65.03 g) was added to the solvent. To the solution was added 4,4'-diamino-2,2'-dimethylbiphenyl (DMB, 1,080.96 g), followed by 4,4'-oxydianiline (ODA, 1,018.73 g). A first portion of biphenyl-tetracarboxylic acid dianhydride (BPDA) (1,524.71 g) was added. After stirring for 20 minutes, a sample of the reaction mixture was analyzed for viscosity. A second portion of BPDA (1,420.97 g) was added, and the reaction mixture was stirred for 20 additional minutes. A sample of the reaction mixture was analyzed for viscosity. A third portion of BPDA (42.81 g) was added, and the reaction mixture was stirred for 20 additional minutes. A sample of the reaction mixture was analyzed for viscosity. After stirring for 8 hours, phthalic anhydride (PA, 77.62 g) was added. The resulting reaction mixture was stirred until no more solid was visible. After 2 hours, the product was removed from the reaction vessel, filtered, and weighed. Structures of the starting materials are shown below:

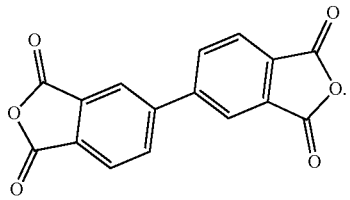

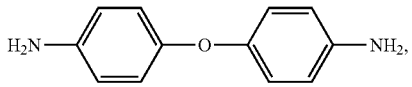

Example 2

Preparation of a Highly Branched Polyamic Amide Aerogel Film

The resin (10,000 grams) prepared in Example 1 was mixed with 2-methylimidazole (250 grams) for five minutes. Benzoic anhydride (945 grams) was added, and the solution mixed an additional five minutes. After mixing, the resultant solution was poured onto a moving polyester substrate that was heated in an oven at 100° C. for 30 seconds. The gelled film was collected and placed into an acetone bath. After immersion for 24 hours, the acetone bath was exchanged for fresh acetone. The soak and exchange process was repeated six times. After the final exchange, the gelled film was removed. The acetone solvent was evaporated under a stream of air at room temperature, and subsequently dried for 2 hrs hours at 200° C. The final recovered aerogel part had open-cell structure as observed by scanning electron microscopy (SEM) performed on a Phenom Pro Scanning Electron Microscope (Phenom-World, the Netherlands), exhibited a density of 0.20 g/cm$^3$ and porosity of >85% as measured according to ASTM D4404-10 with a Micromeritics® AutoPore V 9605 Automatic Mercury Penetrometer (Micromeritics® Instrument Corporation, U.S.A.). The final recovered film exhibited a tensile strength and elongation of 1200 psi (8.27 MPa) and 14%, respectively, at room temperature as measured according to ASTM D882-02.

Example 3

Preparation of a Highly Branched Polyamic Amide

The reaction vessel as described in Example 1 was charged with dimethylsulfoxide (DMSO) (108.2 lbs. 49.1 kg), and the mechanical stirrer speed was adjusted to 120-135 rpm. 1,3,5-tris(4-aminophenoxy) benzene (TAPOB, 65.93 g) was added to the solvent. To the solution was added 4,4'-diamino-2,2'-dimethylbiphenyl (DMB, 1,081.64 g), followed by 4,4'-oxydianiline (ODA, 1,020.23 g). A first portion of BPDA (1,438.35 g) was added. After stirring for 20 minutes, a sample of the reaction mixture was analyzed for viscosity. A second portion of BPDA (1,407.77 g) was added, and the reaction mixture was stirred for 20 additional minutes. A sample of the reaction mixture was analyzed for viscosity. A third portion of BPDA (74.35 g) was added, and the reaction mixture was stirred for 20 additional minutes. A sample of the reaction mixture was analyzed for viscosity. After stirring for 8 hours, phthalic anhydride (PA, 174.00 g) was added. The resulting reaction mixture was stirred until

Example 4

Preparation of a Highly Branched Polyamic Amide Aerogel Monolith

The resin (16,49 kilograms) prepared in Example 3 was mixed with 2-methylimidazole (1.13 kilograms) for five minutes. Benzoic anhydride (3.44 kilograms) was added, and the solution mixed an additional five minutes. After mixing, the resultant solution was poured into a square 16"×16" mold, and then left overnight at room temperature. The gelled shape was removed from the mold, and placed into an acetone bath. After immersion for 24 hours, the acetone bath was exchanged with fresh acetone. The soak and exchange process was repeated five times. After the final exchange, the gelled film was removed. The acetone solvent was evaporated under a stream of air at room temperature, and subsequently dried for 1.5 hrs hours at 200° C. The final recovered aerogel part had open-cell structure as observed by scanning electron microscopy (SEM) performed on a Phenom Pro Scanning Electron Microscope (Phenom-World, the Netherlands), exhibited a density of 0.14 g/cm$^3$ and porosity of >85% as measured according to ASTM D4404-10 with a Micromeritics® AutoPore V 9605 Automatic Mercury Penetrometer (Micromeritics® Instrument Corporation, U.S.A.). The final recovered film exhibited a compression strength of 230 psi at room temperature as measured according to ASTM D395-14.

Example 5

Preparation of a Highly Branched Polyamic Acid

TAPOB (about 2.86 g) was added to the reaction vessel charged with about 2,523.54 g DMSO as described in Example 1. To the solution was added a first portion of DMB (about 46.75 g), followed by a first portion of ODA (about 44.09 g). After stirring for about 20 minutes, a first portion of BPDA (about 119.46 g) was added. After stirring for about 20 minutes, TAPOB (about 2.86 g), DMB (about 46.75 g), and ODA (about 44.09 g) were added. After stirring for about 20 minutes, BPDA (about 119.46 g) was added. After stirring for about 20 minutes, TAPOB (about 2.86 g), DMB (about 46.75 g), and ODA (about 44.09 g) were added. After stirring for about 20 minutes, BPDA (about 119.46 g) was added. After stirring for about 8 hours, PA (about 50.12 g) was added. The resulting reaction mixture was stirred until no more solids were visible. After about 2 hours, the product was removed from the reaction vessel, filtered, and weighed.

Example 6

Preparation of a Highly Branched Aerogel Monolith by Freeze Drying

Figure 6:
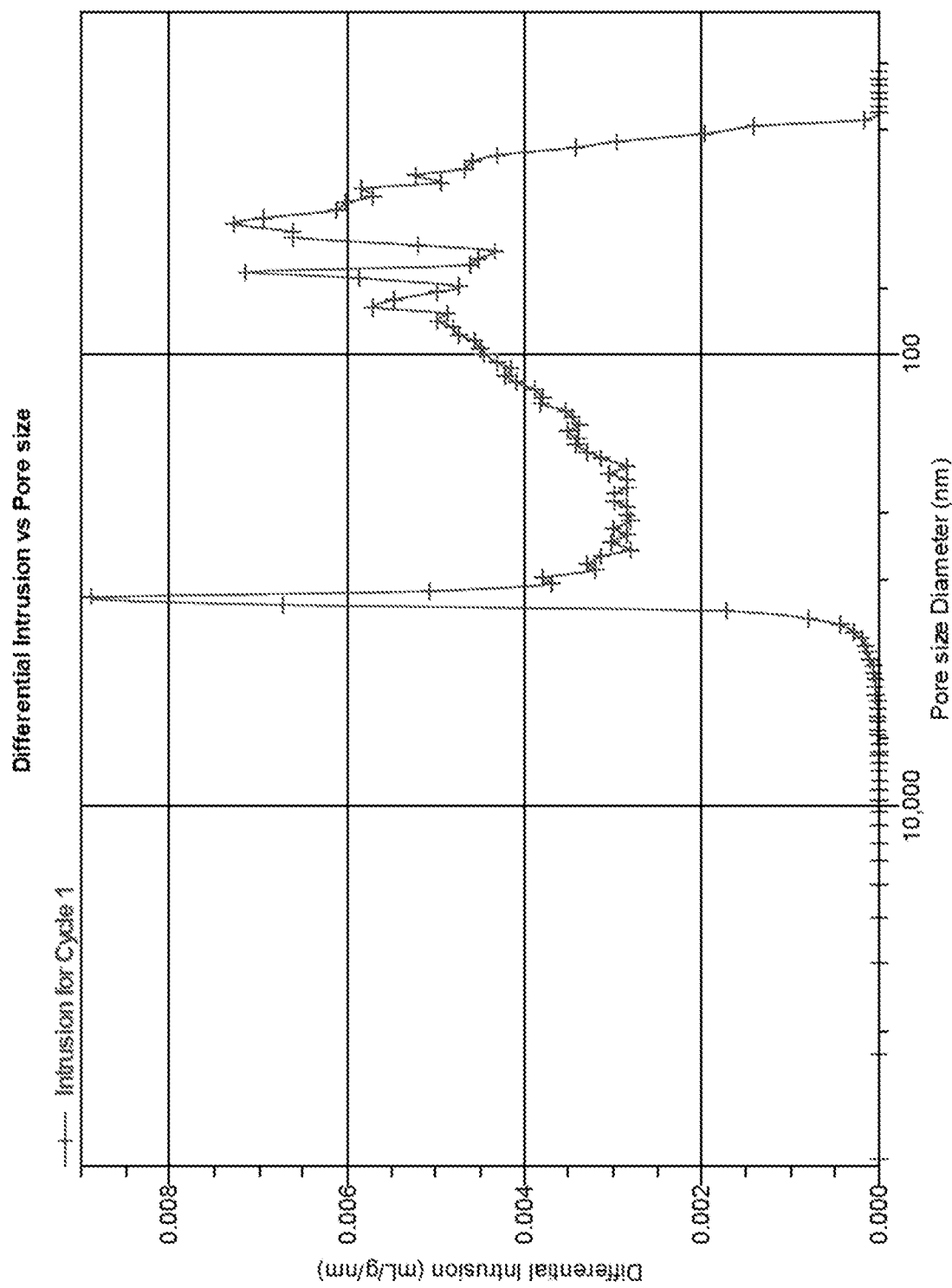
FIG. 6 distribution of pore diameters of an aerogel monolith of the present invention obtained by freeze drying.

The resin (about 400 grams) prepared in Example 5 was mixed with 2-methylimidazole (about 53.34 grams) for five minutes and then benzoic anhydride (about 161.67 grams) for five minutes. After mixing, the resultant solution was poured into a square 3"×3" mold and placed in an oven at 75° C. for 30 minutes and then left overnight at room temperature. The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times The part was subsequently frozen on a shelf freezer, and subjected to subcritical drying for 96 hours in at 5° C., followed by drying in vacuum at 50° C. for 48 hours. The final recovered aerogel part had open-cell structure as observed by scanning electron microscopy (SEM) performed on a Phenom Pro Scanning Electron Microscope (Phenom-World, the Netherlands), exhibited a density of 0.15 g/cm$^3$ and porosity of 92.2% as measured according to ASTM D4404-10 with a Micromeritics® AutoPore V 9605 Automatic Mercury Penetrometer (Micromeritics® Instrument Corporation, U.S.A.). The distribution of pore sizes were measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 6. Notably, and as illustrated in FIG. 6, the produced aerogel includes macropores in its polymeric matrix. It also includes mesopores in the polymeric matrix.

Example 7

Preparation of a Highly Branched Polyamic Acid

TAPOB (about 2.05 g) was added to the reaction vessel charged with about 2,776.57 g DMSO as described in Example 1. To the solution was added a first portion of DMB (about 33.54 g), followed by a first portion of ODA (about 31.63 g). After stirring for about 20 minutes, a first portion of PMDA (about 67.04 g) was added. After stirring for about 20 minutes, TAPOB (about 2.05 g), DMB (about 33.54 g), and ODA (about 31.63 g) were added. After stirring for about 20 minutes, PMDA (about 67.04 g) was added. After stirring for about 20 minutes, TAPOB (about 2.05 g), DMB (about 33.54 g), and ODA (about 31.63 g) were added. After stirring for about 20 minutes, PMDA (about 67.04 g) was added. After stirring for about 8 hours, PA (about 18.12 g) was added. The resulting reaction mixture was stirred until no more solids were visible. After about 2 hours, the product was removed from the reaction vessel, filtered, and weighed.

Example 8

Preparation of a Highly Branched Aerogel Monolith by Freeze Drying

Figure 7:
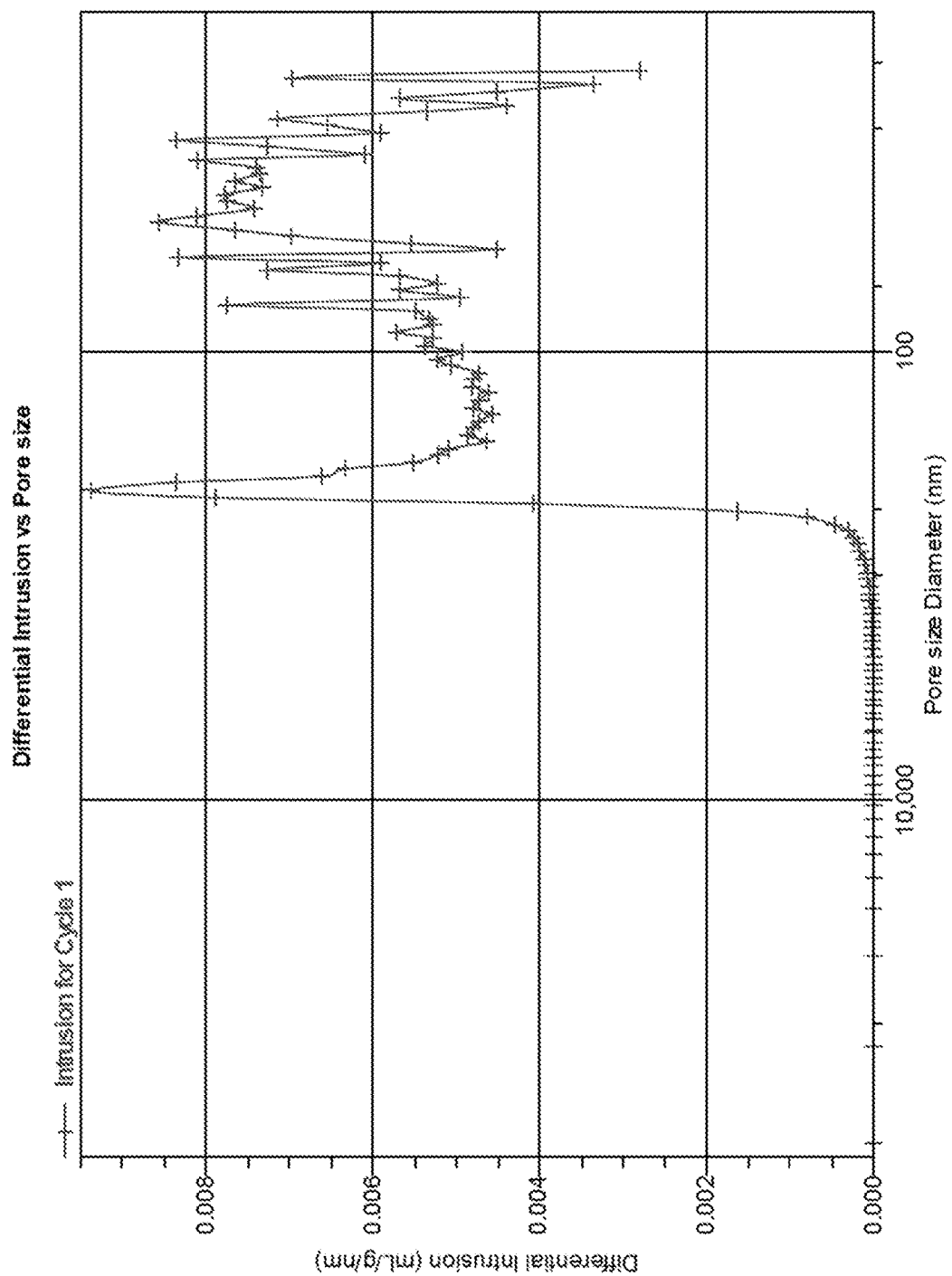
FIG. 7 distribution of pore diameters of an aerogel monolith of the present invention obtained by freeze drying.

The resin (about 400 grams) prepared in Example 7 was mixed with 2-methylimidazole (about 40.38 grams) for five minutes and then benzoic anhydride (about 122.38 grams) for five minutes. After mixing, the resultant solution was poured into a square 3"×3" mold and placed in an oven at 75° C. for 30 minutes and then left overnight at room temperature. The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times The part was subsequently frozen on a shelf freezer, and subjected to subcritical drying for 96 hours in at 5° C., followed by drying in vacuum at 50° C. for 48 hours. The final recovered aerogel part had an open-cell structure as observed by scanning electron microscopy (SEM) performed on a Phenom Pro Scanning Electron Microscope (Phenom-World, the Netherlands), exhibited a density of 0.23 g/cm$^3$ and porosity of 82.7% as measured according to ASTM D4404-10 with a Micromeritics® AutoPore V 9605 Automatic Mercury Penetrometer (Micromeritics® Instrument Corporation, U.S.A.). The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 7. Notably, and as illustrated in FIG. 7, the produced aerogel includes macropores in its polymeric matrix. It also includes mesopores in the polymeric matrix. From the trend in the data, it is believed that the aerogel contains some micropores.

Example 9

Preparation of a Linear Polyamic Acid

A reaction vessel was charged with about 776.42 g DMSO as described in Example 1. To the solution was added a first portion of ODA (about 12.76 g). After stirring for about 20 minutes, a first portion of PMDA (about 11.82 g) was added. After stirring for about 20 minutes, ODA (about 12.76 g) was added. After stirring for about 20 minutes, PMDA (about 11.82 g) was added. After stirring for about 20 minutes, ODA (about 12.76 g) was added. After stirring for about 20 minutes, PMDA (about 11.82 g) was added. After stirring for about 8 hours, PA (about 10.62 g) was added. The resulting reaction mixture was stirred until no more solids were visible. After about 2 hours, the product was removed from the reaction vessel, filtered, and weighed.

Example 10

Preparation of a Linear Aerogel Monolith by Freeze Drying

Figure 8:
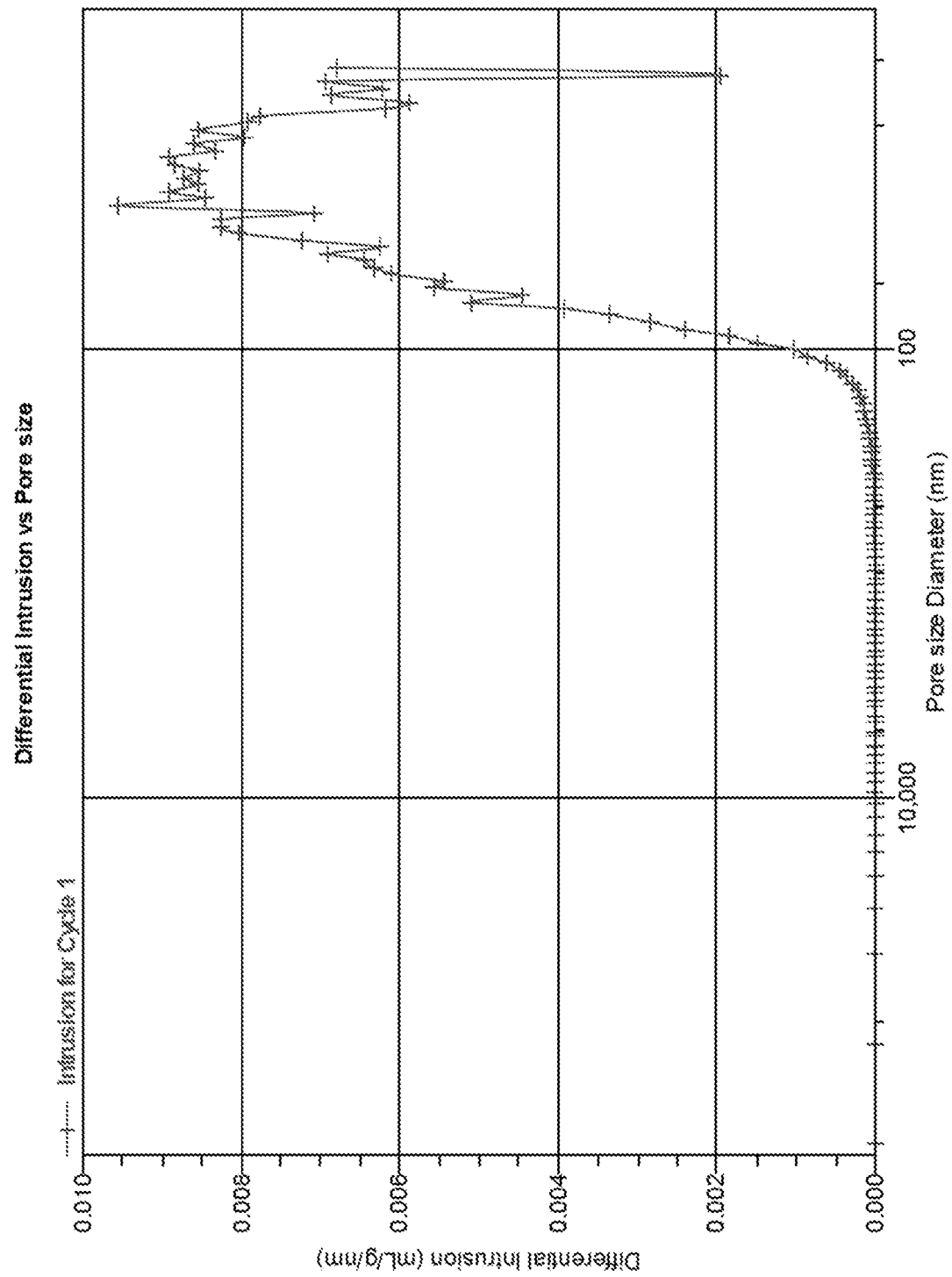
FIG. 8 distribution of pore diameters of an aerogel monolith of the present invention obtained by freeze drying.

The resin (about 400 grams) prepared in Example 9 was mixed with 2-methylimidazole (about 53.38 grams) for five minutes and then benzoic anhydride (about 161.80 grams) for five minutes. After mixing, the resultant solution was poured into a square 3"×3" mold and placed in an oven at 75° C. for 30 minutes and then left overnight at room temperature. The gelled shape was removed from the mold, and placed into an acetone bath. After immersion for 24 hours, the acetone bath was exchanged with fresh acetone. The soak and exchange process was repeated five times. After the final exchange, the bath was replaced with cyclohexane. After immersion for 24 hours, the cyclohexane bath was exchanged for fresh cyclohexane. The soak and exchange process was repeated three times The part was subsequently frozen in a freezer, and subjected to subcritical drying for 96 hours in at 5° C., followed by drying in vacuum at 50° C. for 48 hours. The final recovered aerogel part had open-cell structure as observed by scanning electron microscopy (SEM) performed on a Phenom Pro Scanning Electron Microscope (Phenom-World, the Netherlands), exhibited a density of 0.36 g/cm$^3$ and porosity of 79.0% as measured according to ASTM D4404-10 with a Micromeritics® AutoPore V 9605 Automatic Mercury Penetrometer (Micromeritics® Instrument Corporation, U.S.A.). The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 8. Notably, and as illustrated in FIG. 8, the produced aerogel does not include a primarily macroporuously structured polymeric matrix. Rather, the matrix primarily includes mesopores in the polymeric matrix. From the trend in the data, it is believed that the aerogel contains some micropores.

Example 11

FTIR Data

FTIR spectral data was obtained for the Example 3 resin, the Example 4 aerogel, and a comparative commercial polyimide aerogel (Kapton® polyimide aerogel from DuPont USA (Wilmington, Del., USA) by using a Nicolet iS5 FT-IR spectrometer with an iD7 attenuated total reflectance (ATR) diamond crystal accessory (Thermo Scientific, Waltham, Mass., USA). The diamond crystal was wiped down with isopropanol between samples. Use of the ATR allowed data collection from both solid and liquid samples with no sample preparation. The FTIR data is organized in Table 1.

TABLE 1

| | Group | Absorption frequency | Vibration mode | Example 3 Resin[1] | Example 4 Aerogel[2] | Comparative Commercial Polyimide Aerogel[3] |
|---|---|---|---|---|---|---|
| Polyamic acid (PAA) | Amide-Acid | 2900-3200 | COOH and NH$_2$ | Present | Absent | Absent |
| | Aromatic C—H | 2900-3100 | C—H stretch | Present | Present | Present |
| | Carbonyl from acid | 1710-1720 | C=O (COOH) stretch | Present | Overlap w/ Imide I | Overlap w/ Imide I |
| | Amide I | 1660-1665 | C=O (CONH) stretch | Present | Absent | Absent |
| | Amide II | 1540-1565 | C—NH | Present | Absent | Absent |
| | Carboxylate ion | 1330-1415 | COO$^-$ sym. stretch | Present | Overlap w/ Imide II | Overlap w/ Imide II |
| Polylmide | Imide I | 2900-3100 | C—H stretch | Present | Present | Present |
| | Imide I | 1770-1780 | C=O sym. stretch | Absent | Present | Present |
| | Imide I | 1720-1740 | C=O asym. stretch | Overlap with amic acid | Present | Present |

TABLE 1-continued

| | Group | Absorption frequency | Vibration mode | Example 3 Resin[1] | Example 4 Aerogel[2] | Comparative Commercial Polyimide Aerogel[3] |
|---|---|---|---|---|---|---|
| | Imide II | 1360-1380 | C=N stretch | Absent | Present | Present |
| | Imide III | 1070-1090 | C—H bending | Overlap with DMSO | Present | Present |
| | Imide III | 1120-1140 | C—H bending | Absent | Present | Present |
| | Imide IV | 720-740 | C=O bending | Absent | Present | Present |
| Isoimide model compound[4] | Isoimide | 1805-1750 | C=O | Absent | Overlap w/ Imide I | Overlap w/ Imide I |
| | Isoimide | 1400-1425 | C=N stretch | Absent | Present | Absent |
| | Isoimide | 890-905 | C—O | Overlap with DMSO | Present | Absent |
| Amic Amide model compound[5] | Amic-Amide | 1415-1440 | C=N stretch | Absent | Present | Absent |
| | Amic-Amide | 735-745 | C—N | Absent | Present | Absent |

[1]The gel/resin from Example 3 was used.
[2]The monolith aerogel from Example 4 was used.
[3]Kapton ® polyimide aerogel from DuPont USA (Wilmington, DE, USA).
[4]N-Phenyl-phthalisoimide was used as the isoimide model compound as characterized by Mochizuki et al. "Preparation and properties of polyisoimide as a polyimide-precursor." *Polymer journal* 1994, 26, 3: 315-323.
[5]N,N,N',N',-tetramethylphthalamide was used as the amic amide model compound. Model compound spectra were obtained from the National Institute of Advanced Industrial Science and Technology (AIST) database, which can be found at http://sdbs.db.aist.go.jp/sdbs/cgi-bin/direct_frame_top.cgi.

The invention claimed is:

1. A method of making an aerogel, the method comprising:
   (a) obtaining a solution comprising a polyamic acid and an imidazole;
   (b) adding a dehydrating agent to the solution in an amount where the molar ratio of the imidazole to the dehydrating agent is 0.17:1 to 2.8:1 and reacting the solution at room temperature to 100° C. to produce a polymer matrix gel comprising a polyamic amide; and
   (c) drying the polymer matrix gel to form an aerogel comprising an open-cell structured polymer matrix that includes 5 wt. % to 50 wt. % of the polyamic amide based on the total weight of the aerogel,
   wherein the polymer matrix has an average pore size of 1000 nanometers (nm) to 5000 nm,
   wherein the imidazole is 2-methyl imidazole or 2-ethyl-4-methyl imidazole, and
   wherein the polyamic amide has a repeating structural unit of

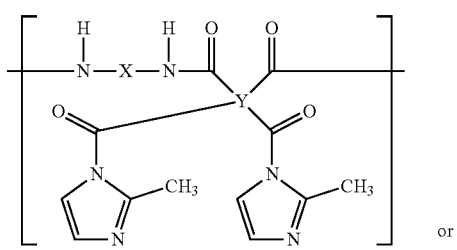

or

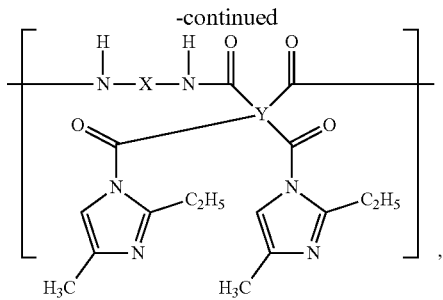

wherein X is a first organic group having at least two carbon atoms, and Y is a second organic group having at least two carbon atoms.

2. The method of claim 1, wherein the aerogel includes 5 wt. % to 25 wt. % of the polyamic amide polymer based on the total weight of the aerogel.

3. The method of claim 1, wherein the polymer matrix has an average pore size of 1000 nm to 1400 nm in diameter.

4. The method of claim 3, wherein the polymer matrix has an average pore size of 1100 nm to 1300 nm.

5. The method of claim 1, wherein the drying comprises supercritical drying, subcritical drying, thermal drying, evaporative air drying, vacuum drying, or any combination thereof.

6. The method of claim 5, wherein the drying comprises evaporative air drying.

7. The method of claim 1, further comprising subjecting the polymer matrix gel to at least one solvent exchange prior to drying the gel.

* * * * *